US012351447B2

(12) United States Patent
Maharaj et al.

(10) Patent No.: US 12,351,447 B2
(45) Date of Patent: Jul. 8, 2025

(54) SELECTABLE GAS INFUSED BEVERAGE DISPENSING SYSTEM

(71) Applicant: Automatic Bar Controls, Inc., Vacaville, CA (US)

(72) Inventors: Vishnu Vishaal Narayan Maharaj, Sacramento, CA (US); Benjamin Adam Piper, Elk Grove, CA (US); Charles Kleinrichert, Annapolis, MD (US)

(73) Assignee: Automatic Bar Controls, Inc., Vacaville, CA (US)

( * ) Notice: Subject to any disclaimer, the term of this patent is extended or adjusted under 35 U.S.C. 154(b) by 1135 days.

(21) Appl. No.: 17/207,498

(22) Filed: Mar. 19, 2021

(65) Prior Publication Data
US 2021/0206617 A1    Jul. 8, 2021

Related U.S. Application Data

(63) Continuation-in-part of application No. 14/706,191, filed on May 7, 2015, now Pat. No. 11,427,456, (Continued)

(51) Int. Cl.
*B67D 1/04* (2006.01)
*A23F 3/00* (2025.01)
(Continued)

(52) U.S. Cl.
CPC .............. *B67D 1/0406* (2013.01); *A23F 3/00* (2013.01); *A23F 5/00* (2013.01); *A23L 2/54* (2013.01);
(Continued)

(58) Field of Classification Search
CPC ........ A23L 2/54; B67D 1/0406; B67D 1/0058
See application file for complete search history.

(56) References Cited

U.S. PATENT DOCUMENTS 4,364,493 A * 12/1982 Raynes ................ B67D 1/1252
251/364
4,438,147 A * 3/1984 Hedrick, Jr. ............. A23G 1/56
426/585
(Continued)

FOREIGN PATENT DOCUMENTS

DE    10 2008 012 486 A1    9/2009
DE    10 2010 012 175 A1    9/2011
(Continued)

OTHER PUBLICATIONS

International Search Report and Written Opinion of the International Searching Authority dated Jul. 6, 2022 in related International Application No. PCT/US2022/071214 (eleven pages).
(Continued)

*Primary Examiner* — Sean M Michalski
(74) *Attorney, Agent, or Firm* — Kilpatrick Townsend & Stockton LLP

(57) ABSTRACT

Disclosed herein are beverage dispensing apparatuses for selectable gas-infused beverage dispensing. The apparatus may have a faucet assembly, a beverage storage unit, a gas storage unit, a liquid/gas infusion unit, and an infusion valve. The faucet assembly may have a housing, a nozzle, a supply valve, and a dispensing valve, configured to control a flow of beverage through the faucet assembly. The beverage dispensing apparatus may use the infusion valve to selectively infuse a selected level of gas within a dispensed beverage.

20 Claims, 16 Drawing Sheets

Related U.S. Application Data which is a continuation of application No. PCT/US2015/028876, filed on May 1, 2015.

(60) Provisional application No. 61/993,700, filed on May 15, 2014.

(51) Int. Cl.
  *A23F 5/00* (2025.01)
  *A23L 2/54* (2006.01)
  *B67D 1/00* (2006.01)
  *B67D 1/08* (2006.01)
  *B67D 1/10* (2006.01)

(52) U.S. Cl.
  CPC ......... *B67D 1/0058* (2013.01); *B67D 1/0066* (2013.01); *B67D 1/0077* (2013.01); *B67D 1/0857* (2013.01); *B67D 1/10* (2013.01); *B67D 2001/0092* (2013.01); *B67D 2001/0487* (2013.01)

(56) References Cited

U.S. PATENT DOCUMENTS

| | | | |
|---|---|---|---|
| 4,610,888 A | | 9/1986 | Teng et al. |
| 4,708,827 A | * | 11/1987 | McMillin .............. B67D 1/0075 |
| | | | 261/DIG. 7 |
| 4,759,474 A | | 7/1988 | Regunathan et al. |
| 5,029,733 A | * | 7/1991 | Hedderick ........... B67D 1/0004 |
| | | | 137/170.1 |
| 5,462,759 A | | 10/1995 | Westerbeek et al. |
| 5,464,124 A | * | 11/1995 | Weyh .................... B01F 23/236 |
| | | | 261/DIG. 7 |
| 5,565,149 A | * | 10/1996 | Page ......................... B67D 1/04 |
| | | | 261/DIG. 7 |
| 5,670,043 A | * | 9/1997 | Lee ...................... B01F 23/2331 |
| | | | 210/360.2 |
| 5,826,432 A | | 10/1998 | Ledbetter |
| 5,980,959 A | | 11/1999 | Frutin |
| 6,024,996 A | * | 2/2000 | Kaper ..................... A23F 5/243 |
| | | | 426/106 |
| 6,138,995 A | * | 10/2000 | Page ..................... B67D 1/1252 |
| | | | 261/DIG. 7 |
| 6,209,855 B1 | * | 4/2001 | Glassford ........... B01F 23/2373 |
| | | | 210/150 |
| 6,234,349 B1 | * | 5/2001 | Bilskie ................. B67D 1/0064 |
| | | | 222/67 |
| 6,235,641 B1 | | 5/2001 | Christenson |
| 6,248,689 B1 | | 6/2001 | Manson |
| 6,719,175 B2 | | 4/2004 | Mackenzie et al. |
| 7,104,531 B2 | * | 9/2006 | Page ....................... B67D 1/007 |
| | | | 261/DIG. 7 |
| 7,717,294 B2 | * | 5/2010 | Bodemann ........... B67D 1/0878 |
| | | | 222/61 |
| 7,806,299 B2 | | 10/2010 | Wauters et al. |
| 8,348,245 B2 | | 1/2013 | Fischer |
| 8,438,969 B2 | * | 5/2013 | Gold .................... B01F 23/2362 |
| | | | 261/DIG. 7 |
| 8,481,097 B2 | | 7/2013 | Skalski et al. |
| 9,327,900 B2 | * | 5/2016 | Cafaro ............... B65D 85/8055 |
| 9,623,383 B1 | * | 4/2017 | Kleinrichert .............. A23L 2/54 |
| 9,723,857 B2 | * | 8/2017 | Endo ........................ A23L 2/40 |
| 10,182,587 B2 | | 1/2019 | Lundberg et al. |
| 10,201,171 B2 | * | 2/2019 | Gordon ............... B67D 1/0066 |
| 11,167,975 B2 | * | 11/2021 | Kleinrichert ......... B67D 1/0066 |
| 11,427,456 B2 | * | 8/2022 | Kleinrichert ......... B67D 1/0406 |
| 2003/0038145 A1 | * | 2/2003 | Arellano ............. B67D 1/0418 |
| | | | 222/399 |
| 2005/0001340 A1 | * | 1/2005 | Page ..................... B01F 35/753 |
| | | | 261/DIG. 7 |
| 2006/0112717 A1 | | 6/2006 | Walton |
| 2006/0185372 A1 | | 8/2006 | Conde Hinojosa |
| 2008/0050496 A1 | * | 2/2008 | Boldor ..................... C12G 3/04 |
| | | | 426/569 |
| 2010/0133708 A1 | | 6/2010 | Fischer |
| 2011/0041543 A1 | | 2/2011 | Tachibana et al. |
| 2013/0029022 A1 | * | 1/2013 | Endo ...................... A23G 9/045 |
| | | | 426/477 |
| 2013/0043274 A1 | * | 2/2013 | Contal ................. B67D 1/0044 |
| | | | 222/145.5 |
| 2013/0196031 A1 | | 8/2013 | Criezis et al. |
| 2014/0220207 A1 | | 8/2014 | Page et al. |
| 2015/0327712 A1 | * | 11/2015 | Samsó Besora ........ A47J 31/38 |
| | | | 99/297 |
| 2015/0329343 A1 | | 11/2015 | Kleinrichert |
| 2016/0280528 A1 | * | 9/2016 | Kleinrichert ......... B67D 1/0077 |
| 2017/0233235 A2 | | 8/2017 | Kleinrichert |
| 2017/0265499 A1 | | 9/2017 | Hyde et al. |
| 2018/0236417 A1 | | 8/2018 | Wilburn Borders |
| 2018/0317524 A1 | * | 11/2018 | Jennings, III ......... B01F 35/833 |
| 2018/0318777 A1 | | 11/2018 | Hartmann |
| 2020/0346915 A1 | | 11/2020 | Cook |
| 2021/0206617 A1 | | 7/2021 | Maharaj et al. |

FOREIGN PATENT DOCUMENTS

| | | |
|---|---|---|
| EP | 0 745 329 A1 | 12/1996 |
| EP | 1 662 218 A1 | 5/2006 |
| EP | 3 275 834 A1 | 1/2018 |
| GB | 2 247 225 A | 2/1992 |
| GB | 2 333 282 A | 7/1999 |
| GB | 2 340 415 A | 2/2000 |
| GB | 2 358 145 A | 7/2001 |
| GB | 2 496 010 A | 5/2013 |
| WO | 2004/102091 A1 | 11/2004 |
| WO | 2012/100333 A1 | 8/2012 |
| WO | 2015/175244 A2 | 11/2015 |
| WO | 2020/047612 A1 | 3/2020 |

OTHER PUBLICATIONS

Non-Final Office Action dated Jul. 5, 2023 in related U.S. Appl. No. 17/850,786 (ten pages).
Non-Final Office Action mailed Dec. 7, 2017 in related U.S. Appl. No. 14/706,101 (eight pages).
Non-Final Office Action mailed Apr. 2, 2019 in related U.S. Appl. No. 14/706,101 (nine pages).
Non-Final Office Action mailed Oct. 3, 2019 in related U.S. Appl. No. 14/706,101 (nine pages).
Non-Final Office Action mailed Jun. 11, 2021 in related U.S. Appl. No. 14/706,101 (20 pages).
Final Office Action mailed Jun. 20, 2018 in related U.S. Appl. No. 14/706,101 (ten pages).
Final Office Action mailed Mar. 30, 2020 in related U.S. Appl. No. 14/706,101 (ten pages).
Notice of Reasons for Rejection mailed Feb. 19, 2019 in Japanese Patent Application No. 2017-512637 with English translation (15 pages).
Japanese Office Action dated Jul. 30. 2019 in related Japanese Patent Application No. 2017-512637 (with English translation) (six pages).
European Office Action dated Jan. 20, 2017 in European Patent Application No. 15792647.8 (two pages).
Extended European Search Report issued Feb. 15, 2018 in Patent Application No. 15792647.8 915 (15 pages).
European Office Action dated Aug. 27, 2019, in European Patent Application No. 15 792 647.8, (13 pages).
Anon, BeerBlast Mixed Gas Dispense System for Beverage, 2009, Mixed Gas Dispense System, https://www.southtekssystems.com/beerblast-mixed-gas-dispense-system/.
James, Stephen J. et al., "Chilling and Freezing of Foods," Food Processing: Principles and Applications, Second Edition, Edited by Stephanie Clark, Stephanie Jung and Buddhi Lamsal, pp. 79-105, (Apr. 7, 2014).
Hanson, Serving Coffee on Tap, CO2 vs. Nitrogen, accessed at https://blog.kegoutlet.com/serving-coffee-on-tap-co2-vs-nitrogen/, May 22, 2013.

(56) References Cited

OTHER PUBLICATIONS

European Office Action dated Feb. 7, 2019 in European Patent Application No. 15 792 647.8 (eight pages).
Korean Office Action dated Jul. 29, 2021 in related Korean Patent Application No. 10-2016-7034912, (three pages).
Canadian Office Action dated Jun. 15, 2021 in corresponding Canadian Patent Application No. 2,949,057, (six pages).
European Office Action dated Mar. 6, 2018 in related European Patent Application No. 15792647.8 (one page).
European Office Communication dated May 19, 2020 in related European Patent Application No. EP 15 792 647.8 (eight pages).
First Office Action dated Jun. 5, 2018 in related Chinese Patent Application No. 201580038242.2 flied May 1, 2015 with English translation (35 pages).
Second Office Action dated Mar. 5, 2019 in related Chinese Patent Application No. 201580038242.2 flied May 1, 2015 with English translation (32 pages).
Third Office Action issued Sep. 25, 2019 in Chinese Patent Application No. 201580038242.2 filed May 1, 2015 with English translation, (38 pages).
Communication pursuant to Article 94(3) EPC issued Jul. 15, 2021 in European Patent Application No. 15792647.8, (seven pages).
Final Office Action issued Jan. 11, 2022 in related Korean Patent Application No. 10-2016-7034912, (two pages).
Notice of Allowance mailed Apr. 4, 2022 in related U.S. Application No. 14/706, 101 (twelve pages).
Corrected Notice of Allowability mailed Apr. 28, 2022 in related U.S. Appl. No. 14/706,101 (eight pages).
International Search Report (ISR) and Written Opinion of the International Searching Authority mailed Sep. 23, 2015 in related International Application No. PCT/US15/28876 (twelve pages).
International Preliminary Report on Patentability dated Nov. 15, 2016 in related International Application No. PCT/US15/28876 (nine pages).
Notice of Allowance dated Sep. 26, 2023 in related U.S. Appl. No. 17/850,786 (five pages).
International Preliminary Report on Patentability dated Sep. 28, 2023 in related application PCT/US2022/071214 (six pages).
Extended European Search Report dated Dec. 19, 2024 in related European Application No. 22772388.9; eight pages.

\* cited by examiner

SELECTABLE GAS INFUSED BEVERAGE DISPENSING SYSTEM

CROSS REFERENCE TO RELATED APPLICATIONS

This application is a continuation-in-part of U.S. application Ser. No. 14/706,191, filed May 7, 2015, the disclosure of which is incorporated herein by reference in its entirety, which is a continuation of PCT/US15/28876, filed May 1, 2015, which claims the benefit of U.S. Provisional Application No. 61/993,700, filed May 15, 2014, the disclosure of which is incorporated herein by reference in its entirety.

BACKGROUND OF THE INVENTION

The present disclosure relates to a dispensing system to infuse a chilled beverage with $N_2$ or a mixed gas and then dispense that gas infused chilled beverage into a receiver such as a glass or mug so that the dispensed chilled beverage has a flavor, odor and appearance enhanced by the gas infusion and beverage dispensation process.

The use of $N_2$ gas to store and dispense carbonated beverages such as beer and soda is conventionally known and is described, for example in U.S. Pat. No. 6,138,995 and in U.S. Pat. No. 8,438,969. However, infusion of other noncarbonated beverages such as coffee or tea and provision of that product as a chilled beverage to a consumer from a dispensing unit is particularly desirable given the surge in coffee popularity. An efficient production of infused noncarbonated beverages can provide for easily accessible commercial production of, for example, nitrogen-infused coffee.

A chilled beverage such as tea or coffee is provided with unique flavor and appearance by $N_2$ infusion and there is a need for a system, such as a self-contained unit that prepares and dispenses chilled $N_2$ or $N_2/CO_2$ infused beverages both in a commercial utility and in a residential kitchen. Moreover, a system incorporating selective infusion is desirable in order to provide for dispensing of either an infused beverage or a non-infused beverage from the same system. Such a selective infusion system may provide for space-saving measures as well as incorporating more flexibility and customization in a selected drink. In addition to flavor and appearance enhancement of the chilled beverage, the system must also be cost effective and user friendly for utilization and maintenance.

SUMMARY OF THE INVENTION

This and other objects are achieved by the present technology, the embodiments of which include a system for dispensing a cooled beverage, comprising: a beverage storage unit capable of being pressurized, for example a beverage tank; a controlled pressurized supply of pure nitrogen gas or a mixed nitrogen gas such as, for example, a mixture of 25% carbon dioxide and 75% nitrogen; a liquid/gas infusion unit, such as a Venturi device or a liquid/gas contactor membrane unit; a diaphragm pump; and a beverage faucet attached downstream to the liquid/gas contactor membrane unit; wherein regulated pressure nitrogen gas or mixed gas is fed via supply lines to the liquid/gas contactor membrane unit, the diaphragm pump and through a secondary regulator to the beverage storage unit, the diaphragm pump is arranged via transfer lines to transfer beverage from the beverage storage unit to the liquid/gas contactor membrane, and the gas feed supply line to the liquid/gas contactor membrane unit comprises a check valve preventing liquid flow from the liquid/gas contactor membrane unit into the gas supply line.

In embodiments of the present technology, the beverage storage unit may be non-pressurized, for example, a bag in box liquid container. Embodiments including non-pressurized beverage storage units may not include a secondary regulator and a gas supply to the beverage storage unit. Thus, the present technology may include a system for dispensing a cooled beverage, comprising: a bag-in-box beverage storage unit; a controlled pressurized supply of a gas comprising at least 50% by weight nitrogen; a liquid/gas infusion unit, such as a Venturi device or a liquid/gas contactor membrane unit; a diaphragm pump; and a beverage faucet attached downstream to the liquid/gas contactor membrane unit; wherein regulated pressure nitrogen gas is fed via supply lines to the liquid/gas contactor membrane unit and the diaphragm pump, the diaphragm pump is arranged via transfer lines to transfer beverage from the bag-in-box beverage storage unit to the liquid/gas contactor membrane unit, and the nitrogen feed supply line to the liquid/gas contactor membrane unit comprises a check valve preventing liquid flow from the liquid/gas contactor membrane unit into the pressurized gas supply line.

In embodiments the system includes a chiller or refrigeration unit that cools at least the beverage storage unit such as a tank or a bag in box container and cools the beverage storage unit or bag in box container, liquid/gas infusion unit and the dispense tower.

In embodiments, the nitrogen gas supply is at least 99.5% $N_2$.

In embodiments, the system is a self-contained unit which is suitable for utility in a commercial facility such as a restaurant or coffee shop.

In embodiments, the present technology includes a method for dispensing a chilled liquid from the systems of the first and second embodiments and further aspects thereof. The method comprises: charging a beverage to the beverage storage unit; opening the gas supply regulator on the gas supply to feed $N_2$ or $N_2/CO_2$ mixture to the liquid/gas contactor membrane unit, diaphragm pump and the secondary gas regulator; adjusting the gas regulator to supply $N_2$ or $N_2/CO_2$ mixture at a pressure of from 20 to 70 psi at the liquid/gas contactor membrane unit and diaphragm pump; adjusting the secondary regulator to pressurize the beverage storage unit to 10-12 psi; pumping the chilled liquid from the beverage storage unit through the diaphragm pump to the liquid/gas contactor membrane unit; contacting the chilled liquid with $N_2$ or $N_2/CO_2$ mixture in the liquid/gas contactor membrane unit to disperse and/or dissolve the $N_2$ or $N_2/CO_2$ in the liquid to obtain a $N_2$ gas infused liquid; and dispensing the $N_2$ gas infused liquid through the beverage faucet to a receiver. Optionally the beverage may be chilled prior to charging to the beverage storage unit, may be chilled while in the beverage storage unit or chilled prior to the charge and chilled in the tank.

When the beverage is in a bag in box container pressurization of the container is not necessary and beverage flow to the liquid/gas contactor membrane is accomplished only via the diaphragm pump.

In one aspect of the method of the present technology, the chilled beverage is coffee that is cooled to a temperature of 34 to 37° F. and infused with 20 to 50 ppm $N_2$.

In a further aspect of embodiments of the present technology, the beverage faucet is a slow pour faucet optionally equipped with a restrictor nozzle or restrictor plate.

In embodiments, a beverage dispensing system includes a beverage dispensing apparatus comprising: a faucet assembly, comprising a housing, a nozzle, a supply line, and a dispensing valve, a beverage storage unit, a gas storage unit, a liquid/gas infusion unit, and an infusion valve. The dispensing valve of the faucet assembly may be fluidly coupled between the nozzle and the supply line, configured to be actuated to open and close to control a flow of beverage from the supply line to the nozzle. The liquid/gas infusion unit may be fluidly coupled to the beverage storage unit and the supply line, and configured to infuse a beverage with the gas in response to the gas and the beverage flowing through the liquid/gas infusion unit.

In embodiments, the beverage dispensing system may switch between an infusion state and a non-infusion state. In an infusion state, the beverage dispensing system dispenses an infused beverage. In the infusion state, the infused beverage may be a beverage with any level of infusion from 0%-100% infusion, with 100% infusion being the maximum capacity of gas infused into a beverage. In a non-infusion state, the beverage dispensing system dispenses a non-infused beverage. The infusion state may be controlled by an infusion valve.

In embodiments, the infusion valve may allow a user to adjust a level of infusion of the beverage with the gas. The infusion valve may respond to a user input to adjust the level of infusion of the beverage with the gas. For example, the user input may be sent to a controller which actuates the infusion valve, putting the system into an infusion or a non-infusion state.

An infusion valve may control a flow of the beverage through the infusion unit and/or the infusion valve may control a flow of the gas through the infusion unit. An infusion valve may be fluidly coupled between the gas storage unit and the liquid/gas infusion unit. An infusion valve may be fluidly coupled between the beverage storage unit and the liquid/gas infusion unit.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Throughout this description all ranges described include all values and sub-ranges therein, unless otherwise specified. Additionally, the indefinite article "a" or "an" carries the meaning of "one or more" throughout the description, unless otherwise specified.

According to the present disclosure the term "beverage" means any noncarbonated aqueous liquid material that is a homogeneous liquid substantially free of solids having a flavor due to dissolved components.

According to the present disclosure dispensing of the chilled beverage means opening a faucet of the system to allow the chilled $N_2$ or $N_2/CO_2$ selectively infused beverage to flow from the system into a receiver such as a glass, mug or other drinking container. Throughout the following description the term "gas infused" will be employed to describe either $N_2$ or $N_2/CO_2$ infused beverage. If an embodiment is directed specifically to a $N_2/CO_2$ mixture or specifically to only $N_2$ infusion, the actual gas composition is explicitly disclosed.

Dispensing of the gas infused chilled beverage is an element of the present technology wherein reduction of pressure on the gas infused beverage allows escape of infused gas and results in unique properties which distinguishes the dispensed beverage by enhancement of the beverage's flavor and/or appearance. In embodiments, such gas infusion may be selective. The selective infusion may occur through a controller capable of switching the system between an infusion state and a non-infusion state.

An aspect of the technology utilizes a liquid/gas infusion unit for infusing a gas into the beverage. For example, the liquid/gas infusion unit may be a Venturi device, a liquid/gas contactor membrane unit, infusion pumps, or any other suitable mechanism for infusing a gas into a liquid.

Throughout this description, the terms nitrogen, nitrogen gas, $N_2$ and $N_2$ gas are used interchangeably and convey the same meaning unless otherwise specified. The term mixed gas is used to describe a gas mixture containing at least 50% $N_2$ with the remainder being carbon dioxide.

The present inventors have recognized that beverages other than carbonated drinks such as beer and soda may have enhanced flavor, texture, and attractive appearance as a result of infusing the beverage with nitrogen or a mixture of nitrogen and carbon dioxide. Upon study of methods to disperse and dissolve nitrogen or a combination of nitrogen and carbon dioxide into a chilled beverage such as coffee, tea or other noncarbonated beverages such as juices and electrolyte drinks, for example, the inventors have designed a dispensing system to provide a gas infused chilled beverage in such a way to present the beverage with a unique and appealing flavor, texture, and appearance.

In the description of the Figures that follow, elements common to the schematic system will have the same number designation unless otherwise noted.

Figure 1:
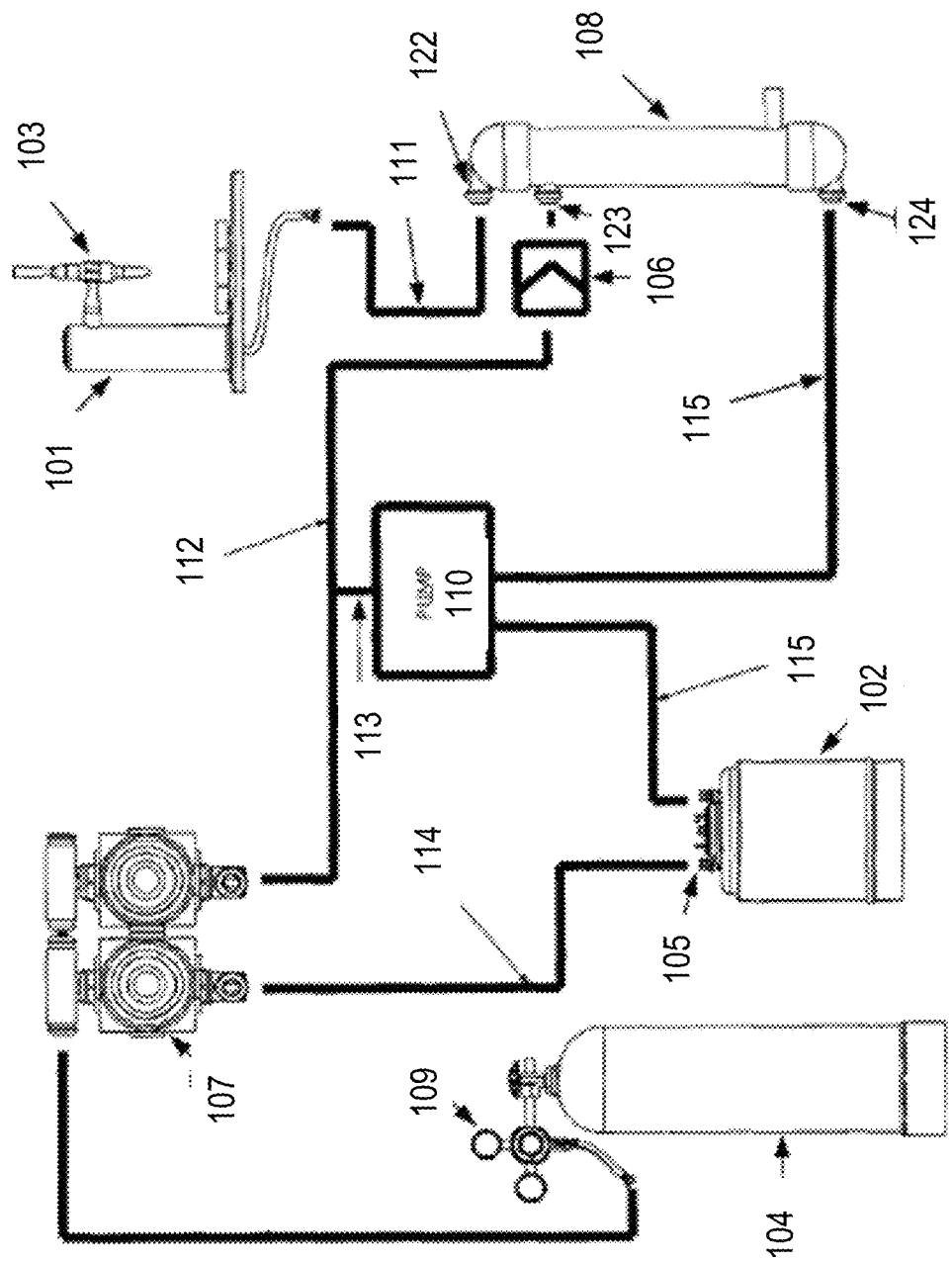
FIG. 1 is a schematic diagram of the system having a beverage storage unit according to embodiments of the present technology.

In an embodiment, for example as shown schematically in FIG. 1, a system for dispensing a cooled beverage may comprise a beverage storage unit capable of being pressurized 102; a controlled pressurized gas supply of pure nitrogen gas or a mixed gas 104; a gas supply assembly 109, a liquid/gas infusion unit 108, such as a liquid/gas contactor membrane unit; a beverage pump 110; and a beverage faucet 103 located in a dispense tower assembly 101 attached downstream in beverage flow to the liquid/gas contactor membrane unit via line 111 wherein regulated pressure gas is fed to the liquid/gas contactor membrane unit via gas feed supply line 112, to the beverage pump 110 via line 113 and through a secondary regulator (107) to the beverage tank (104). The beverage pump is arranged via a transfer line (115) to transfer beverage from the beverage tank to the liquid/gas contactor membrane unit and from the liquid/gas contactor to the tower assembly (101). The gas feed supply line (112) to the liquid/gas contactor membrane unit comprises a check valve (106) preventing liquid flow from the liquid/gas contactor membrane unit via gas inlet (123) into the gas supply line. The chilled beverage is pumped into the liquid/gas contactor via beverage inlet (124) and the gas infused beverage exits the liquid/gas contactor at beverage outlet (122). For convenience and ease of beverage replacement or renewal, the beverage tank may be connected to the gas feed line and the feed line to the pump via quick connect couplings (105) well known in the industry.

In embodiments, systems may incorporate an inline strainer and/or filtration unit (not shown in FIG. 1) in the beverage line from the beverage storage unit to the pump or in the line from the pump to the liquid/gas infusion unit in order to protect the gas permeable membranes of the liquid/gas contactor membrane unit the filtration from solids which may be present in the beverage.

Figure 2:
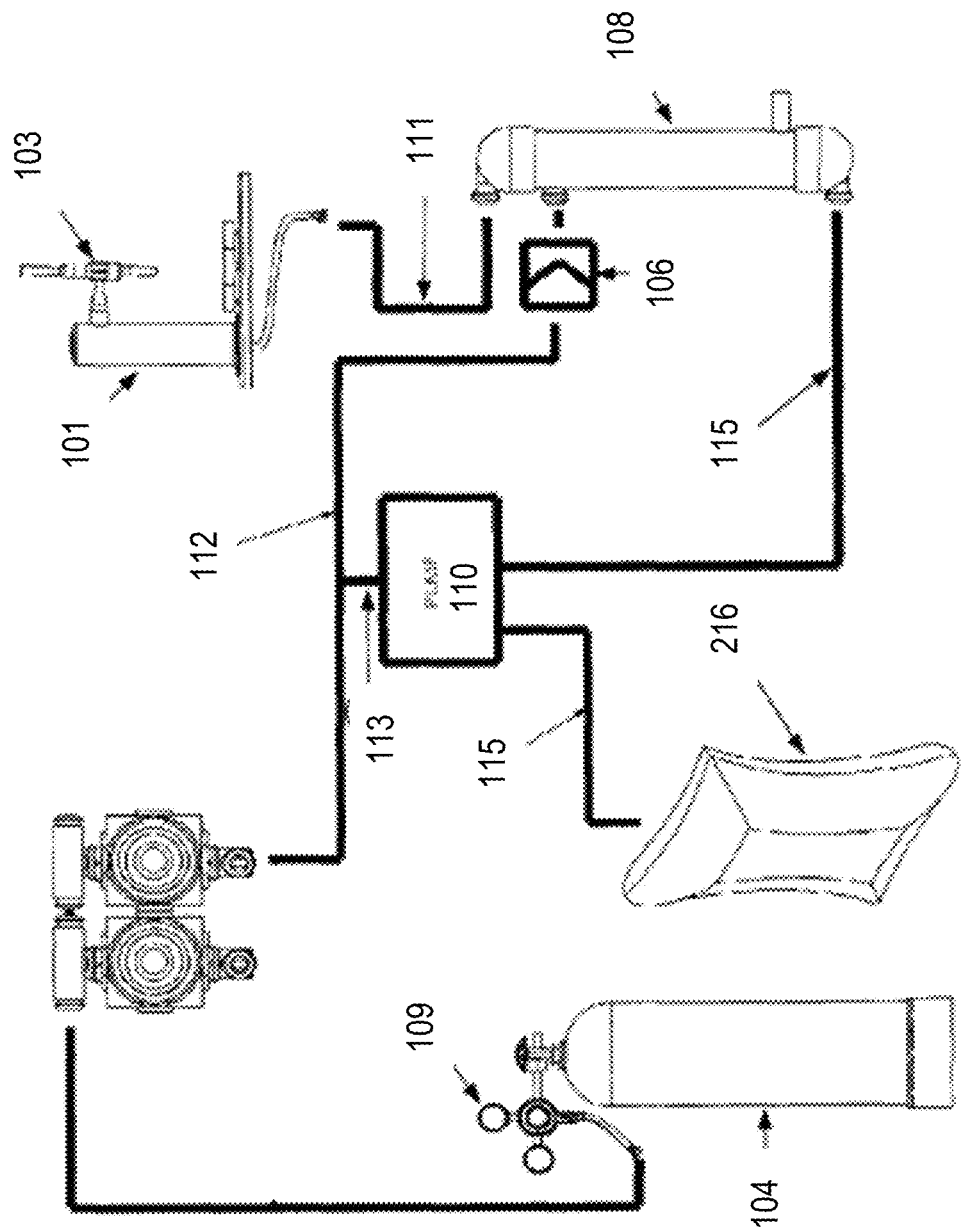
FIG. 2 is a schematic diagram of the system having a bag-in-box beverage storage unit according to embodiments of the present technology.

In an embodiment as shown schematically in FIG. 2, the beverage storage unit is, for example, a bag in box beverage storage unit 216. Using the bag in box beverage storage unit 216, pressurization of the beverage storage unit is not necessary and therefore there is no need for a gas line to the container or secondary gas regulator to control the pressure of that line. The pump 110 transfers the beverage to the liquid/gas contactor membrane unit.

Bag in box containers are commercially available in a range of volume sizes and materials of construction. Any suitable container of volume size convenient to the intended application may be employed. Generally, a container of 1 to 5 gallons is employed based on convenience of handling and size and structure of the refrigeration system to be employed. However, systems constructed for high volume dispense may be larger, for example 10 gallons or more. The box component of the container may be corrugated cardboard while the bag may be constructed of any material accepted for use in the food and beverage industry.

FIGS. 1 and 2 schematically show the arrangement of the fundamental components of the dispense systems of the present technology. However, in the construction of commercial functional units, secondary components such as safety regulators, valves, couplings, harnesses, support structure and other functional components known to one of skill in the beverage dispense technology may be incorporated in the system. For example, fluid lines within the system may use valves that are actuated by a processor, such as gate valves, solenoid valves, butterfly valves, or other valves capable of regulating fluid flow through a system. The fluid lines may flow through pipe fittings and different fluid lines may be connected by wye connectors, tee sockets, or other fluid node fittings.

Figure 6:
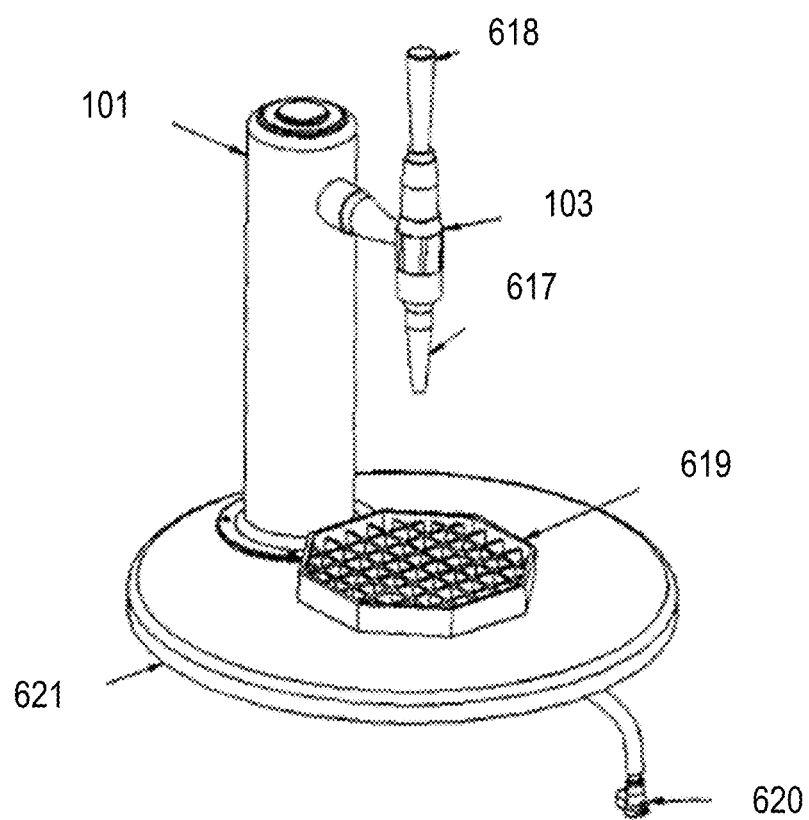
FIG. 6 shows a diagram of a tower assembly according to embodiments of the present technology.

The faucet 103 shown in FIGS. 1, 2 and 6 may be a slow pour faucet designed to dispense the chilled gas infused liquid at a controlled rate to allow foam formation upon dispense and provide the unique flavor and appearance associated with the product obtained via dispense from the system of this invention. Commercially available faucets typically employed to tap beer are suitable for use as the faucet 103.

FIG. 6 shows a schematic diagram of a faucet tower assembly according to an embodiment of the invention. In an aspect of the invention a restrictor nozzle 617 is inserted in the tip of the faucet to further enhance the foam formation during liquid dispense. Restrictor nozzles providing differing dispense characteristics are known and commercially available. Additionally, a restrictor plate may be employed in place of or in combination with the nozzle to enhance the frothing effect of the dispense system. The embodiment shown in FIG. 6 also includes a tap handle 618 which may be a decorative enhancement to the system, a drip tray 619 and quick connect coupling 620 to line 111 shown in FIGS. 1 and 2. In various embodiments, the tap handle, drip tray and quick connect coupling are commercial enhancements to the system.

In embodiments the system is arranged or constituted in a self-contained unit or dispense kit that may be conveniently shipped to and placed in a commercial establishment for preparation and dispensation of specialty gas infused chilled beverages. The system may or may not include a chilling or refrigeration unit capable of cooling the system components and beverage therein to a temperature less than ambient or room temperature. However, if the cooling capability is not included in the system provision to maintain the beverage in a cooled state may be made according to methods known to one of ordinary skill in the art.

Figure 3:
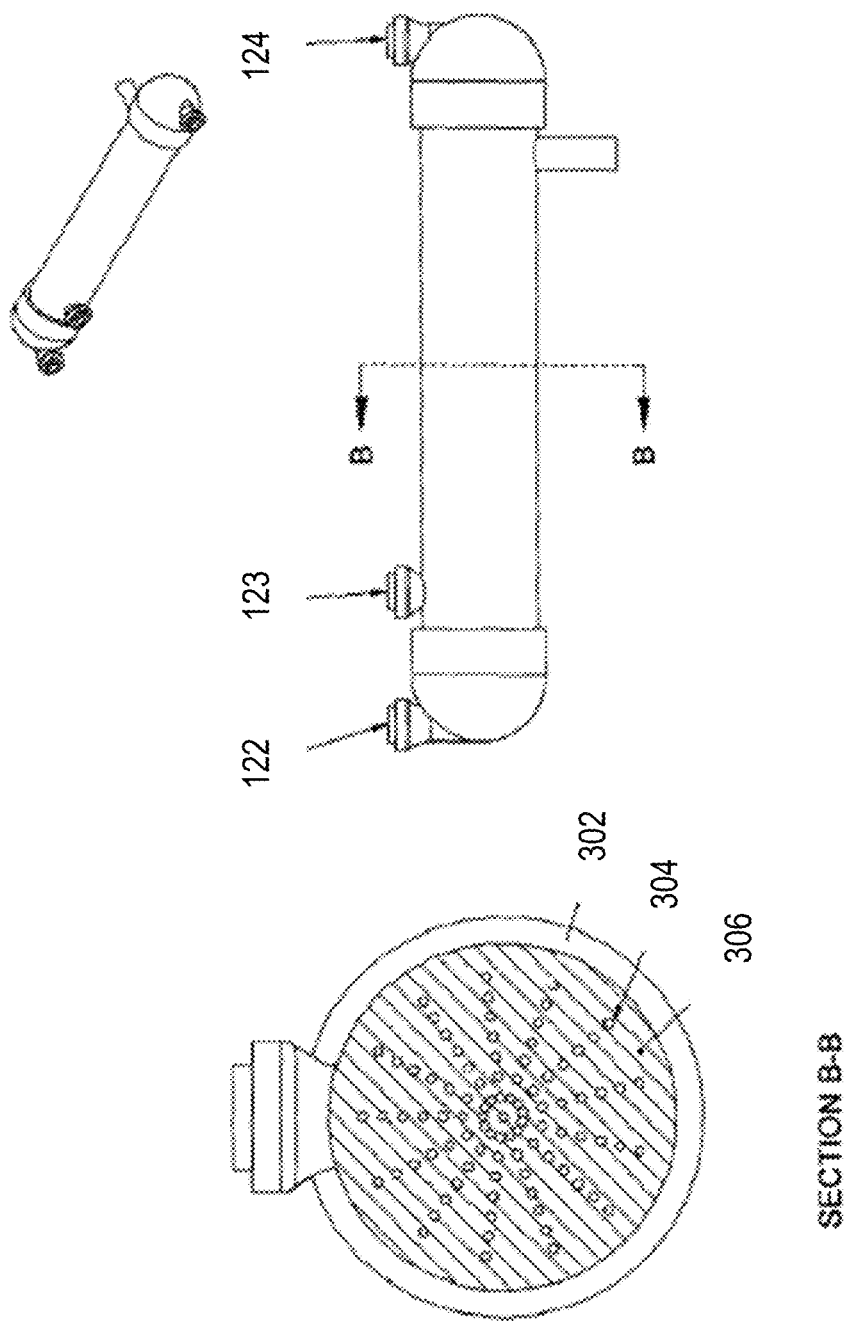
FIG. 3 is a schematic diagram of a liquid/gas contactor membrane unit according to embodiments of the present technology.

The self-contained unit provides a user friendly and convenient chilled gas infused beverage preparation and dispensing unit especially suited for coffee bars, cafeterias, restaurants and other commercial establishments where beverages are served. In embodiments, the present technology provides a kit of the above described components that includes a mounting panel housing that attaches to a wall or panel and mounts some or all of the system components to the wall. FIG. 3 shows a schematic diagram of one possible wall mount arrangement of the kit assembly.

The chilling or refrigeration system is capable to cool the system and the beverage therein to approximately 36° F. although the choice of temperature will be dependent upon the beverage being handled in the system and the flavor and appearance sought. Chilling or refrigeration systems suitable for the system of the present technology are commercially available. One example refrigeration system is a cylinder shaped refrigeration unit, such as "BREEZER™" from Iowa Rotocast Plastics, Inc. that may conveniently contain the components of the system.

The beverage storage unit may be any pressurizable tank constructed of a material suitable for contact with beverages for human consumption. Materials of construction may include stainless steel or a plastic. The volume of the tank is not limited. In some embodiments wherein the system is a self-contained unit the volume of the beverage storage unit may be from 2 quarts to 5 gallons.

The nitrogen supply may be a $N_2/CO_2$ mixture having at least 50% by weight $N_2$ or may be essentially pure nitrogen having a $N_2$ content of at least 99.5% by weight. Grades of nitrogen containing differing content of carbon dioxide within this range may be employed to impart varying flavor and appearance effects to the dispensed beverage.

The nitrogen or mixed gas is supplied via a gas regulator valve through a pressure rated supply line containing a "T" connection, such as through a tee socket, to both the liquid/gas infusion unit, shown in FIG. 1 as a liquid/gas contactor membrane unit, and the diaphragm pump as indicated in FIG. 1. The gas regulator valve may function in some embodiments as an infusion valve to control the infusion state of the beverage dispensing system. In this manner the pressure of the chilled beverage pumped into the liquid/gas contactor membrane unit and the pressure of the $N_2$ or $N_2/CO_2$ gas in the liquid/gas contactor membrane unit are controlled by the regulator on the supply tank.

The diaphragm pump may be any appropriately sized diaphragm pump constructed for transfer of liquids for human consumption. Pumps suitable for this use are commercially available and as one example, a "SHURFLO™ BEER ACE" diaphragm pump from Pentair Inc. may be noted.

The beverage storage unit is pressurized with $N_2$ or mixed gas that is supplied via a secondary regulator as shown in FIG. 1. Generally, the pressure in the beverage storage unit is regulated to be lower than the pressure of the $N_2$ or $N_2/CO_2$ mixture supplied to the liquid/gas contactor membrane unit and diaphragm pump.

A check valve is located in the $N_2$ feed line to the liquid/gas contactor membrane unit to prevent liquid "backflow" from the liquid/gas contactor membrane unit to the nitrogen gas supply.

The liquid/gas contactor membrane unit is any suitable membrane unit containing hollow fibers such that $N_2$ or $N_2/CO_2$ mixture gas supplied to the liquid/gas contactor membrane unit contacts the chilled beverage via passage through a gas permeable membrane and is dissolved and/or dispersed into the beverage to form a $N_2$ or $N_2/CO_2$ infused beverage. In general description, a liquid/gas contactor membrane unit may be constructed of a cylindrical tube containing hollow fiber membranes. Water, aqueous liquid or a liquid having a surface tension similar to water is pumped into the space about the exterior of the hollow membranes. $N_2$ or $N_2/CO_2$ gas at a set pressure as determined by the supply regulator is passed into the interior of the hollow fiber membrane from where it permeates through the membrane and the permeate $N_2$ or $N_2/CO_2$ contacts the chilled beverage on the exterior of the membrane and infuses into the beverage. A schematic diagram of an example of a liquid/gas contactor membrane unit is shown in FIG. 3. As indicated in the cross-sectional view B-B the contactor unit contains a series of hollow fiber membranes 304 arranged within a solid casing 302 and surrounded by fluid space 306. Liquid/gas contactor units are conventionally known and any unit which provides for gas-liquid contact across a permeable membrane may be suitably employed. In one embodiment of FIG. 3, the $N_2$ or $N_2$ mixed gas is passed through the hollow membranes while the chilled beverage is passed through the fluid space surrounding the hollow fiber membranes. However, it is also possible to pass the chilled beverage through the hollow fiber membranes while passing the $N_2$ or $N_2$ mixed gas through the fluid space. Variation and control of the gas pressure in the interior of the hollow fiber membrane relative to the pressure of the liquid on the exterior of the hollow fiber membrane allows for differing degrees of gas infusion into the liquid.

The gas infused beverage is transported from the liquid/gas contactor membrane unit to a dispense tower equipped with a beverage faucet. In embodiments, for example as previously described, the beverage faucet is a slow pour faucet that dispenses the chilled gas infused beverage at a rate of from 0.1 to 5 ounces per second, preferably from 0.5 to 3 ounces per second and most preferably from 0.8 to 1.2 ounces per second. This effect and dispense rate may be further enhanced by insertion of a restrictor nozzle in the tip of the faucet as previously described.

Figure 4:
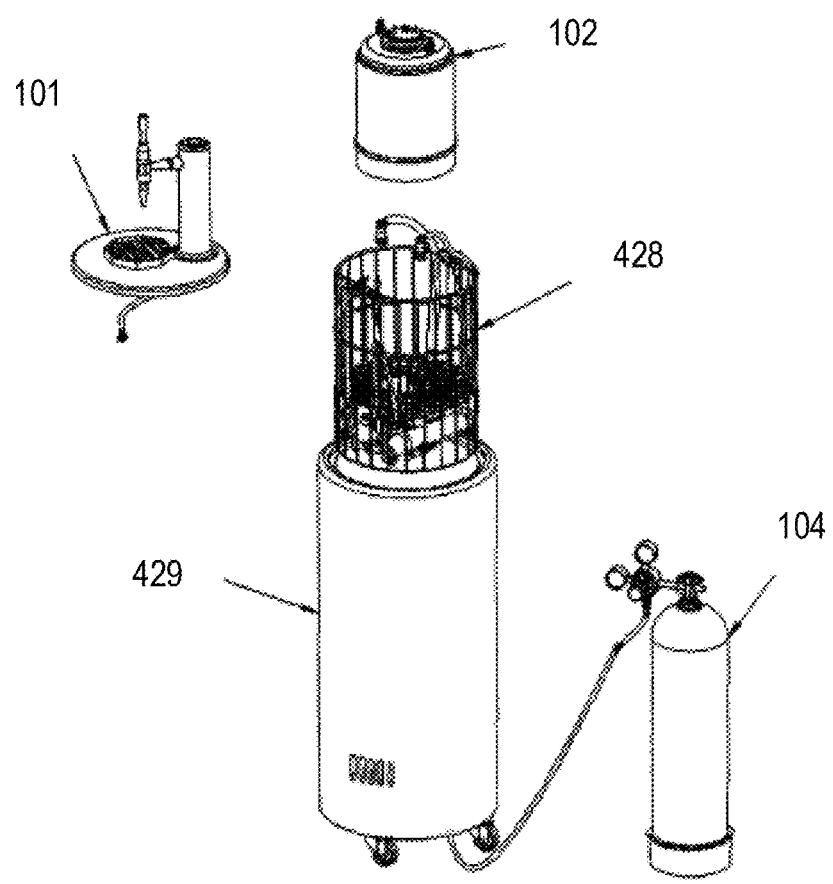
FIG. 4 is a schematic diagram of an arrangement of a portable dispense system kit according to embodiments of the present technology.
Figure 5:
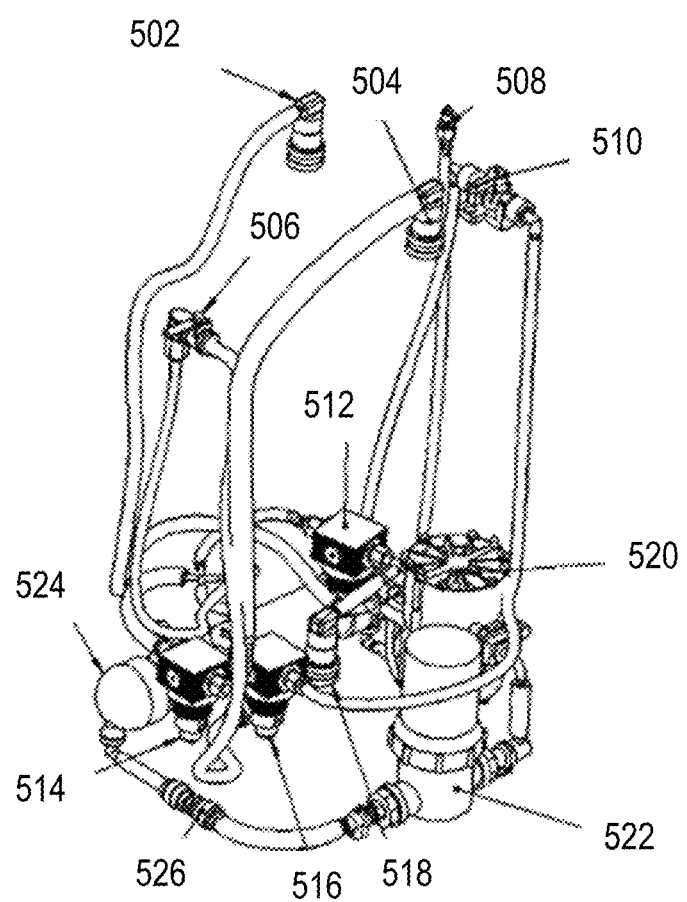
FIG. 5 is a diagram of the components of a basket assembly showing structural components according to embodiments of the present technology.

A detailed diagram of an example of a dispense kit assembly arrangement according to embodiments of the present technology is shown in FIG. 4. In FIG. 4 a beverage storage unit 102 capable of being pressurized is arranged inside a refrigeration body 429. A mixed gas or nitrogen supply tank 104 is located external to the refrigeration unit and supplies pressurized gas into the unit to the liquid/gas infusion unit, which is here a liquid/gas contactor membrane unit 108, the beverage pump 110 and the beverage storage unit 102 via the secondary regulator 107 all arranged in a basket assembly 428 as shown in FIG. 5. This unit may be portable if equipped with wheels or simply free-standing.

The assembly shown in FIG. 5 includes the arrangement shown in FIG. 1 and other secondary components that may be included to enhance the safety and performance of the system as previously described. The component identification numbering for the special embodiment shown in FIG. 5 is identified according to the following key.

502 liquid quick connect
504 gas quick connect
506 clean/purge valve
508 liquid quick connect to tower assembly
510 gas control valve to pump
512 safety gas regulator for liquid/gas contactor
514 secondary gas regulator
516 gas regulator to pump and liquid/gas contactor
518 connection to gas assembly
520 Shurflow beverage pump
522 beverage filter assembly
524 liquid/gas contactor unit
526 back check valve The arrangement shown in FIG. 5 is assembled such that the components may be placed in a basket assembly as indicated in FIG. 4 and placed within a refrigeration unit along with the beverage storage unit 102.

Figure 7:
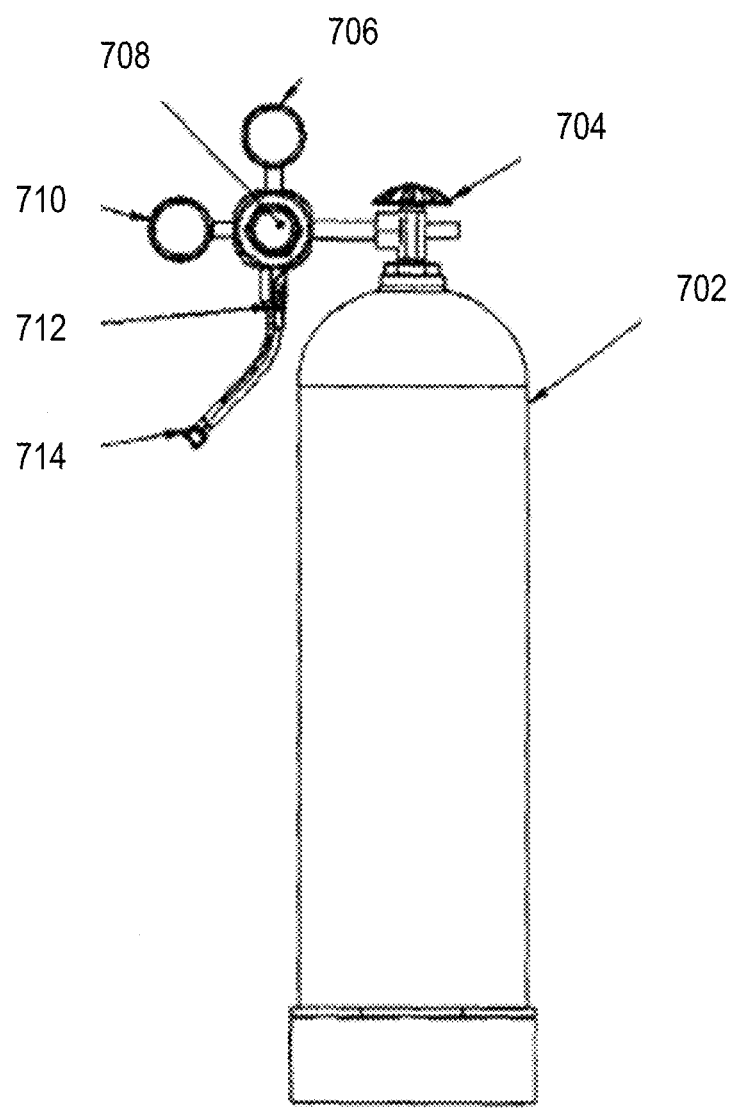
FIG. 7 shows a gas storage unit assembly for use with the system, according to embodiments of the present technology.

FIG. 7 shows a standard gas supply assembly that may be utilized with the dispense system of the present technology. The technology is not limited to the assembly of FIG. 7 and any pressure regulated supply system providing nitrogen or nitrogen mixed gas may be employed.

The component identification numbering for the gas supply system shown in FIG. 7 is identified according to the following key.

702 N2 or mixed gas tank
704 tank open/close valve
706 outlet pressure gauge
708 regulator adjustment control
710 gas volume gauge
712 regulator valve
714 gas quick connect coupling In embodiments a dispenser unit, for example as schematically shown in FIGS. 1 and 2, may be assembled in a unit suitable for mounting on a wall or a panel of a vehicle. The arrangement of the component parts may be vertical or horizontal and may have components on opposite sides of the wall or panel. For example, only the faucet tower may be visible on one side while the other functional components including the refrigeration unit, liquid/gas contactor, beverage storage unit, pump and lines are out of view on the opposite side.

In embodiments, the present technology provides a method for preparing and dispensing a chilled gas infused liquid from a system of the present technology. The method comprises charging a cooled beverage to the beverage storage unit; opening the regulator on the $N_2$ or $N_2/CO_2$ mixture supply to feed the gas to the liquid/gas contactor membrane unit, diaphragm pump and the secondary regulator; adjusting the supply regulator to supply $N_2$ or $N_2/CO_2$ at a pressure of from 20 to 70 psi at the liquid/gas contactor membrane unit and beverage pump; adjusting the secondary regulator to pressurize the beverage storage unit to 10-12 psi; pumping the chilled liquid from the beverage storage unit through the diaphragm pump to the liquid/gas contactor membrane unit; contacting the chilled liquid with $N_2$ or $N_2/CO_2$ in the liquid/gas contactor membrane unit to disperse and/or dissolve the $N_2$ or $N_2/CO_2$ in the liquid to obtain a $N_2$ or $N_2/CO_2$ infused liquid; and dispensing the $N_2$ or $N_2/CO_2$ infused liquid through the beverage faucet at a controlled rate to a receiver.

The method for dispensing from a bag-in-box container differs only in that there is no gas supplied to the bag-in-box container and no pressure applied to the bag-inbox container.

In embodiments the beverage is coffee that is cooled to a temperature of 30 to 40° F., preferably 32 to 38° F. and most preferably, 34 to 37° F. Further, when the beverage is coffee the $N_2$ pressure in the liquid/gas contactor membrane unit and at the beverage pump is from 20 to 70 psi and the $N_2$ content in the infused chilled coffee obtained is from 20 to 80 ppm, preferably 30 to 60 ppm and most preferable 40 to 50 ppm.

The effect of the slow dispensing of the slow pour faucet is such that upon release from the system and flow to the receiver such as a serving glass, $N_2$ gas escapes from the chilled coffee as it cascades to the glass and results in the appearance of a head of foam or froth on the surface of the chilled coffee providing a flavor, aroma and appearance unique to the product obtained according to the present technology.

The unique effect of the "head" obtained according to the invention may be attributable to the novel application of $N_2$ gas pressure applied in liquid/gas contactor membrane unit and the beverage pump. Although in one embodiment the beverage pump is a diaphragm pump driven by the $N_2$ or $N_2/CO_2$ mixture from the supply tank, it may be possible in other system embodiments to control the diaphragm pump by another method or gas supply independent of the $N_2$ or $N_2/CO_2$ mixture supply pressure.

Diaphragm pumps are conventionally employed in industry for the pumping of beer, soda and other beverages especially because such pumps are compatible with carbonated as well as non-carbonated liquids. Although utility of a diaphragm pump has been disclosed in these embodiments, it may be possible to employ other pumps suitable for liquids intended for human consumption.

In an embodiment wherein the gas pressure to the diaphragm pump or other suitable beverage pump is independent of the $N_2$ or $N_2/CO_2$ supply pressure, the relative pressure of the $N_2$ or $N_2/CO_2$ gas in the liquid/gas contactor membrane unit and the pressure of the liquid in the liquid/gas contactor membrane unit may be varied in order to impart more unique appearance and possibly flavor enhancement to the dispensed chilled beverage. In this embodiment the ratio of the $N_2$ or $N_2/CO_2$ gas feed pressure to the liquid pressure of the chilled beverage in the liquid/gas contactor membrane unit may be from 20/1 to 1/20 in contrast to the embodiment described above wherein because the diaphragm pump and $N_2$ feed to the liquid/gas contactor membrane unit are from the same supply, the ratio of the $N_2$ gas feed pressure to the liquid pressure of the chilled beverage in the liquid/gas contactor membrane unit is approximately 1/1.

One of ordinary skill may learn the effect of variation of the ratio of the $N_2$ or $N_2/CO_2$ gas feed pressure to the liquid pressure of the chilled beverage in the liquid/gas contactor membrane unit on properties of the dispensed chilled beverage through experimentation and adjust the settings as learned to obtain a $N_2$ or $N_2/CO_2$ infused chilled beverage having unique flavor, aroma and appearance.

In a further embodiment, the system may further contain a blast chiller unit, wherein a hot liquid such as brewed coffee or tea is first rapidly chilled or superchilled to 40° F. or lower and then charged to the beverage storage unit. Such rapid chill may serve to further enhance the flavor and aroma of the $N_2$ or $N_2/CO_2$ infused chilled beverage when dispensed to a drinking glass or other receiver.

Figure 8:
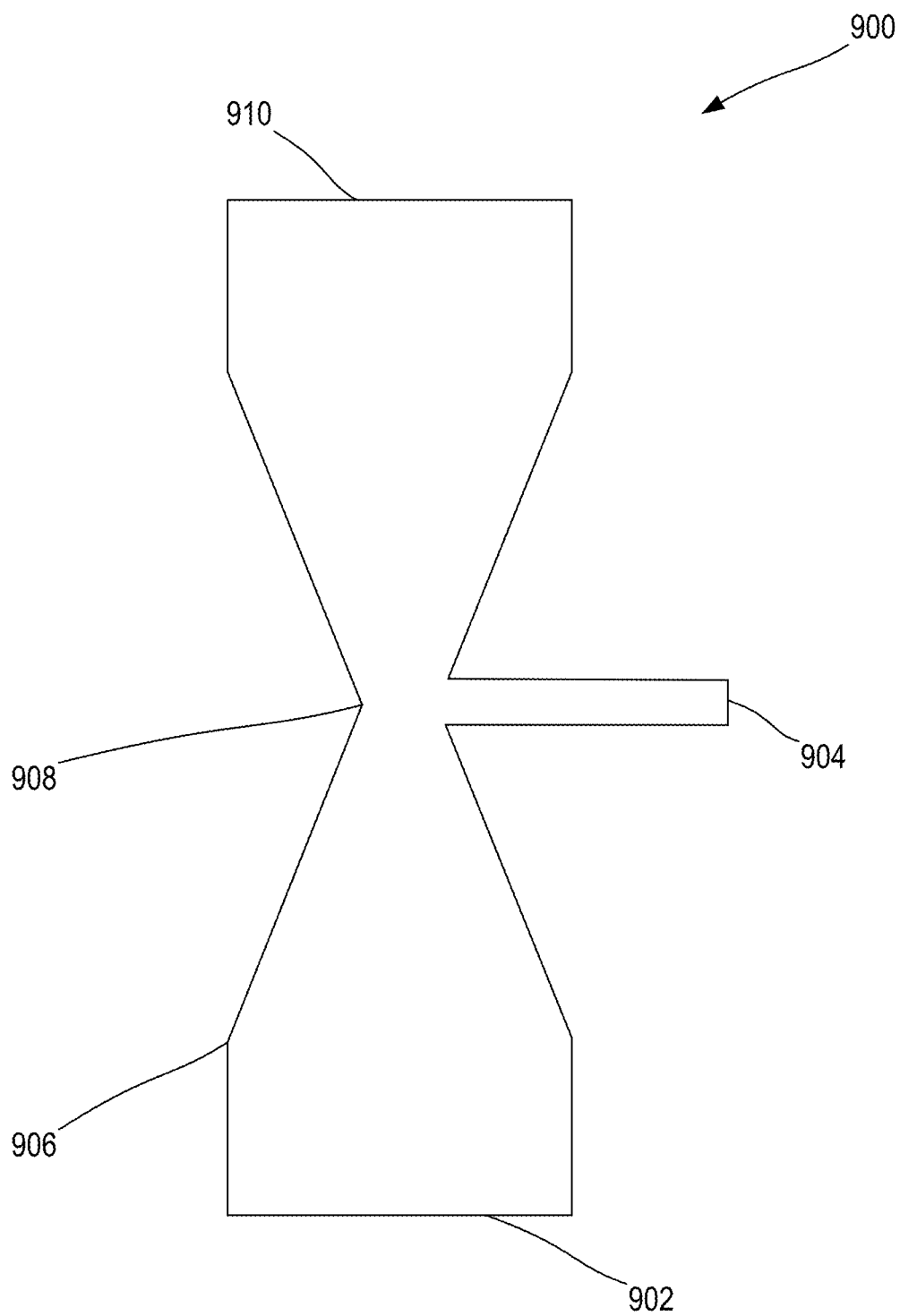
FIG. 8 is a diagram of a Venturi device according to embodiments of the present technology.

In embodiments, the liquid/gas infusion unit may be a Venturi device. An exemplary Venturi 900 is shown in FIG. 8. The Venturi device 900 may have a gas input line 904, a beverage input line 902, an unconstricted input region 906, a constriction region 908, and an output line 910. The unconstricted input region 906 has a larger cross-sectional area than the cross-sectional area of the restricted region 908.

The gas input line 904 may be fluidly connected to a gas storage unit. The gas input line 904 may be positioned on the Venturi device 900 such that gas flows into the Venturi device 900 in the constricted region 908.

The beverage input line 902 may be fluidly connected to a beverage storage unit. The beverage input line 902 may be positioned on the Venturi device 900 such that beverage flows into the Venturi device 900 in the unconstricted input region 906.

The output line 910 may be fluidly connected to a faucet. The output line may be downstream of the constricted region, such that fluid flowing out of the constricted region passes through the output line when exiting the Venturi device 900.

As a beverage enters the Venturi device 900, it flows from the unconstricted input region 906 to the constricted region 908. As the fluid enters the constricted region 908, due to the property of flowing incompressible fluids, the velocity of the fluid increases causing the fluid pressure to drop. Due to the drop in fluid pressure, the beverage draws in the gas flowing into the constricted region 908 in order to infuse the beverage. After the fluid passes through the constricted region 908, it flows into an output line 910.

In embodiments, systems for the infusion of a beverage may utilize the fluid properties of the Venturi device described above and shown in FIG. 8 for selective infusion, for example as shown in the system schematics of FIGS. 9-13. The selective infusion may occur through regulated fluid flow in the dispensing apparatus. The fluid flow of the beverage and/or the gas may be regulated by valves through pipes and connectors to direct the fluids in the dispensing unit. For example, in order to join two fluid streams before the faucet, the fluids may flow through a wye connector.

A beverage dispensing apparatus may have a faucet assembly, a beverage storage unit, a gas storage unit, a liquid/gas infusion unit, a controller, and a user interface. The beverage storage unit and the gas storage unit provide a beverage supply and a gas supply to the fluid lines of the beverage dispensing apparatus. The fluid lines may regulate the flow of beverage supply and gas supply with valves. The liquid/gas infusion unit, such as the Venturi device described in FIG. 8, can infuse a flowing beverage with a flowing gas from the beverage storage unit and the gas storage unit, respectively, producing a gas-infused beverage, such as, for example, nitrogen-infused coffee. The selective infusion through the liquid/gas infusion unit can be controlled by a controller actuating infusion valves into an open or closed state, regulating whether or not a beverage is infused with a gas. The resulting beverage, infused or non-infused, is then dispensed through the faucet assembly.

The system may include one or more infusion valves for regulating the infusion of a beverage flowing through the apparatus. The infusion valve(s) may be along a fluid flow path of either or both of a beverage or a gas in the dispensing apparatus. An infusion valve can be any valve or multiple valves in the system which may be opened or closed to change the infusion state of the dispensed beverage. The infusion valve may be opened or closed to control the flow of either a beverage or a gas to a liquid/gas infusion unit, thereby allowing or preventing infusion of the beverage with the gas in a dispensed beverage. For example, in embodiments, a beverage infusion valve may control the flow of beverage to a liquid/gas infusion unit by directing the beverage along an infusion line that feeds into a liquid/gas infusion unit or along a bypass line that bypasses the liquid/gas infusion unit. In embodiments, a gas infusion valve may control the flow of gas into a liquid/gas infusion unit by allowing gas to flow to a gas inlet, such that it infuses with a flowing beverage in the liquid/gas infusion unit or halting the flow of gas such that a beverage flowing through the liquid/gas infusion unit is non-infused.

The system may include a controller. The controller may be a processor, computer, analog circuitry, digital circuitry, a switch, or any other suitable mechanism for controlling components of the system. The controller may be communicatively coupled to a user interface, the infusion valve and/or other valves of the system. In embodiments, the controller may be communicatively coupled to a diaphragm pump for the beverage storage unit. The controller, in response to a user input, may operatively actuate the various valves in the beverage dispensing apparatus to dispense either an infused or non-infused beverage, depending on the user input.

Figure 9A:
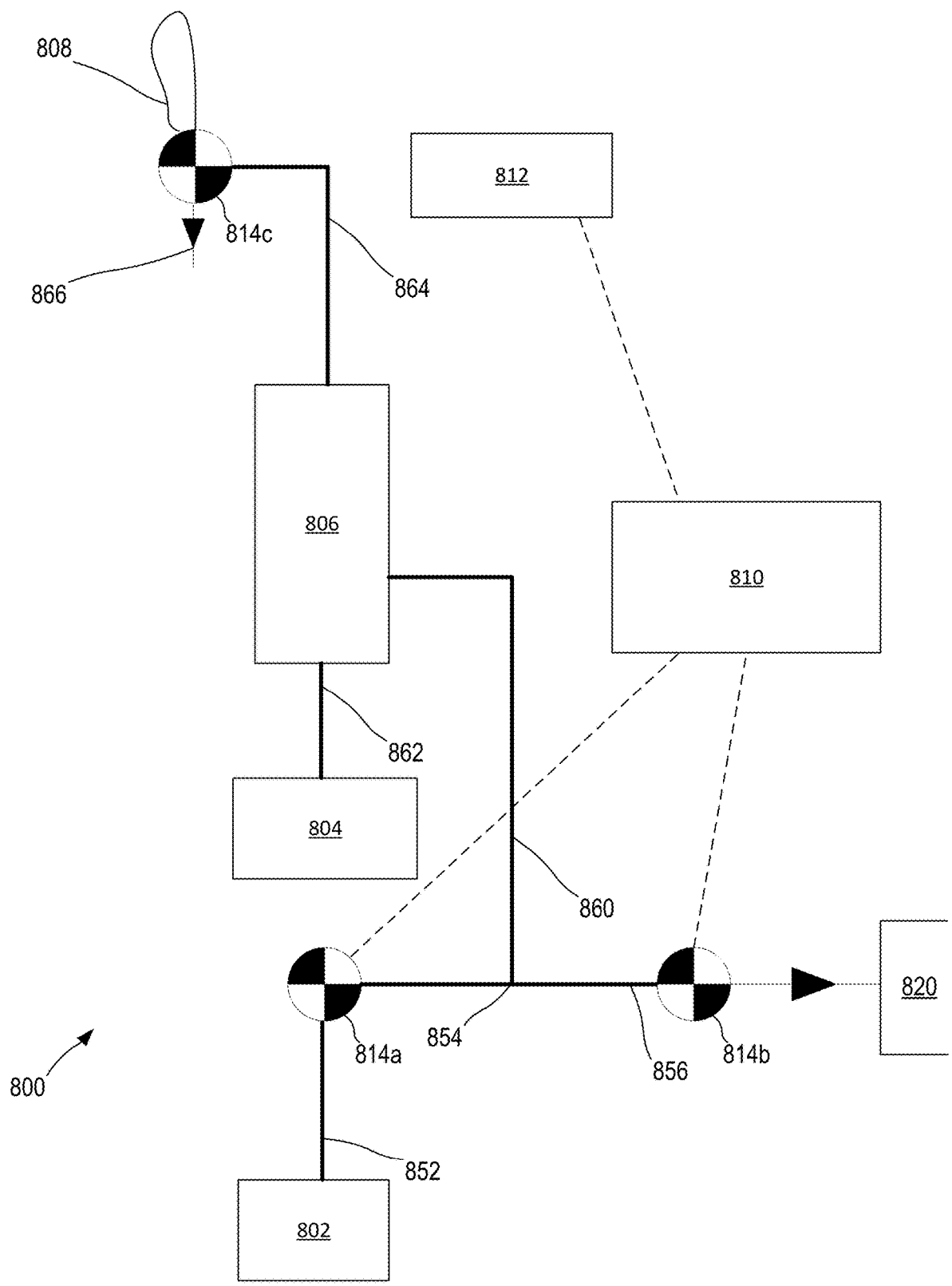
FIG. 9A is a schematic diagram of a system for selectable gas infusion including a pressure relief line, according to embodiments of the present technology.

FIG. 9A is an embodiment of a beverage dispensing apparatus 800 with selectable gas infusion. The beverage dispensing apparatus 800 has a gas storage unit 802, a beverage storage unit 804, a liquid/gas infusion unit 806, a faucet assembly 808, a controller 810, and a user interface 812. The apparatus 800 has fluid lines 852, 856, 860, 862, 864, and 866 shown in FIG. 9A to cause the respective gas and beverage to flow through the apparatus. Flow of fluids through the apparatus may be regulated by the valves 814a, 814b, and 814c. The beverage storage unit may supply a beverage such as coffee or tea as described above.

The gas storage unit 802 is fluidly connected to the liquid/gas infusion unit 806 through fluid line 852, 856, and 860. The beverage storage unit 804 is fluidly connected to the liquid/gas infusion unit 806 through fluid line 862. The liquid/gas infusion unit 806 is fluidly connected to the faucet assembly 808 through fluid line 864. Valve 814a regulates fluid flow through fluid line 852. Valve 814b regulates fluid flow through fluid line 856. The fluid flowing out from the liquid/gas infusion unit 806 is regulated by the valve 814c.

The controller 810 is communicatively coupled to the user interface 812 and to the valves 814a, 814b, and 814c. The controller 810 may be located in a compartment of the beverage dispensing apparatus 800, located with the user interface 812, or otherwise located within the beverage dispensing apparatus 800. For example, the beverage dispensing apparatus 800 may comprise a front panel where the user interface 812 is located, and the controller 810 may be behind the front panel. In other embodiments, the controller 810 may be on a rear-facing region of the beverage dispensing apparatus 800.

The gas storage unit 802 is fluidly connected to the node 854 by fluid line 852. The flow of gas through fluid line 852 is regulated by gas control valve 814a. After passing through the valve 814a, gas flowing through the gas line 852 encounters a node 854, which splits the gas line 852 into a pressure relief line 856 and an infusion line 860. The pressure relief line 856 can be opened to atmosphere in order to reduce the internal pressure between the gas supply 802 and the liquid/gas infusion unit 806 when a buildup of gas occurs. The infusion line 860 allows gas to flow into the liquid/gas infusion unit 806.

Beverage from beverage supply 804 flows into beverage line 862. In the embodiment of FIG. 9A, for both infused and non-infused beverages, the beverage is directed through the liquid/gas infusion unit 806, although in other embodiments a dispensed beverage may have other fluid paths, including fluid paths that do not include the liquid/gas infusion unit. After passing through the liquid/gas infusion unit 806, any beverage, infused or non-infused, flows into the supply line 864. Dispensed beverage flows out of the faucet assembly 808 in dispensing line 866.

A liquid/gas infusion unit is used to selectively infuse a flowing beverage with a flowing gas. In embodiments, the liquid/gas infusion unit comprises a beverage inlet, a gas inlet and a beverage outlet. In embodiments, the liquid/gas infusion unit 806 may be a Venturi device, for example the Venturi device shown in FIG. 8. As beverage flows through the liquid/gas infusion unit, if a gas is delivered to the gas inlet, then the beverage becomes infused with the gas. If there is no gas flow to the liquid/gas infusion unit 806, then the beverage passing though the liquid/gas infusion unit 806 does not become infused. In embodiments, the liquid/gas infusion unit may selectively infuse a beverage by having both beverage flow to the beverage inlet and the gas inlet. In embodiments, the liquid/gas infusion unit may not infuse a beverage by having the beverage flow to the beverage inlet and no gas flow into the gas inlet. In embodiments, the liquid/gas infusion unit may not infuse a beverage by preventing beverage flow into the beverage inlet, and directing the beverage to bypass the liquid/gas infusion unit.

In embodiments, for example the embodiment shown in FIG. 9A, the liquid/gas infusion unit 806 is in constant fluid communication with the beverage storage unit 804. In the infusion state, gas flow is delivered to the gas inlet of the liquid/gas infusion unit 806, and the flowing beverage is infused with the flowing gas in the liquid/gas infusion unit 806. In the non-infusion state, gas flow is not delivered to the liquid/gas infusion unit 806. In embodiments, the liquid/gas infusion unit 806 may be a liquid/gas contactor membrane unit or any other suitable mechanism to infuse flowing gas into a flowing stream of liquid. The liquid/gas infusion unit 806 is positioned downstream of both the gas storage unit 802 and the beverage storage unit 804.

In embodiments, the faucet assembly 808 comprises a housing, a nozzle and a dispensing valve. The dispensing valve may be the valve 814c. The faucet assembly 808 is fluidly connected to the liquid/gas infusion unit 806 by the supply line 864. The faucet assembly 808 dispenses the liquids that flow through the system. The faucet assembly 808 can have a housing and a nozzle that are in fluid communication with the supply line flowing through the beverage dispensing apparatus 800.

In embodiments, the controller 810 may be a computer or a processor that sets the beverage dispensing apparatus 800 into an infusion state or a non-infusion state. In embodiments, the controller may be a physical toggle switch or a circuit board with a logic controller. To set the state of the beverage dispensing apparatus 800, the controller 810 is communicatively coupled to actuate the control valves 814a, and valve 814b. The controller 810 may actuate the valves to open or close by switches, electromechanical gates, rotary motors, or any other suitable mechanism to actuate valves. In embodiments, the controller may also control additional accessories of the beverage dispensing apparatus 800, such as a diaphragm pump, the gas storage unit 802, the beverage storage unit 804, and other additional components.

In FIG. 9A, the controller 810 may actuate to open or close valve 814a and valve 814b in response to an input received by the user interface 812. For example, for an infused beverage, the controller 810 switches the beverage dispensing apparatus 800 into an infusion state by opening the valve 814a to allow gas to reach the liquid/gas infusion unit 806. For a non-infused beverage, the controller 810 switches the beverage dispensing apparatus 800 into a non-infusion state by closing the valve 814a, to prevent gas from the gas storage unit 802 reaching the liquid/gas infusion unit 806.

The control valves 814a, 814b, and dispensing valve 814c can be used to regulate the fluid flow through the beverage dispensing apparatus 800. In FIG. 9A, gas control valve 814a is the infusion valve in that gas control valve is used to adjust the level of infusion a beverage may have by regulating the amount of gas flowing through the infusion line 860, such as a 10%, 20%, 30%, 40%, 50%, up to 100% infused beverage, wherein a 100% infused beverage is infused with the maximum amount of gas the beverage can be infused with. In embodiments, the infusion amount can be regulated by a ratio of gas pressure entering the liquid/gas infusion unit to beverage pressure entering the liquid/gas infusion unit, such as between 0% and 2000% gas pressure of a beverage pressure. The gas control valves are communicatively coupled with the controller 810.

After infusing a beverage with gas, residual pressurized gas may remain in fluid lines 852 and 860. Residual pressurized gas may cause infusion of a beverage flowing into the liquid/gas infusion unit 806 even when valve 814a is closed, which may lead to unwanted infusion of subsequent dispensed beverages. In order to prevent unwanted infusion, for example, when a non-infused beverage is to be dispensed after an infused beverage, the residual pressurized gas may be passively or actively purged from the lines prior to flowing the beverage of the non-infused beverage through the liquid/gas infusion unit. In embodiments, for example as shown in FIG. 9A, a pressure relief line 856 and a pressure relief valve 814b may be used to passively purge the residual pressurized gas. The pressure relief line 856 can direct residual gas into the atmosphere 820. In some embodiments, the residual gas is directed into the atmosphere 820 by an exhaust valve, exhaust pipe, or any other suitable means of relieving residual gas into the atmosphere. Gas control valve 814b can be a pressure relief valve that opens up the pressure relief line 856 to reduce backpressure caused by residual gas within the fluid conduits of the beverage dispensing apparatus 800. Dispensing valve 814c can regulate the flow of the infused beverage into the faucet assembly 808.

Figure 9B:
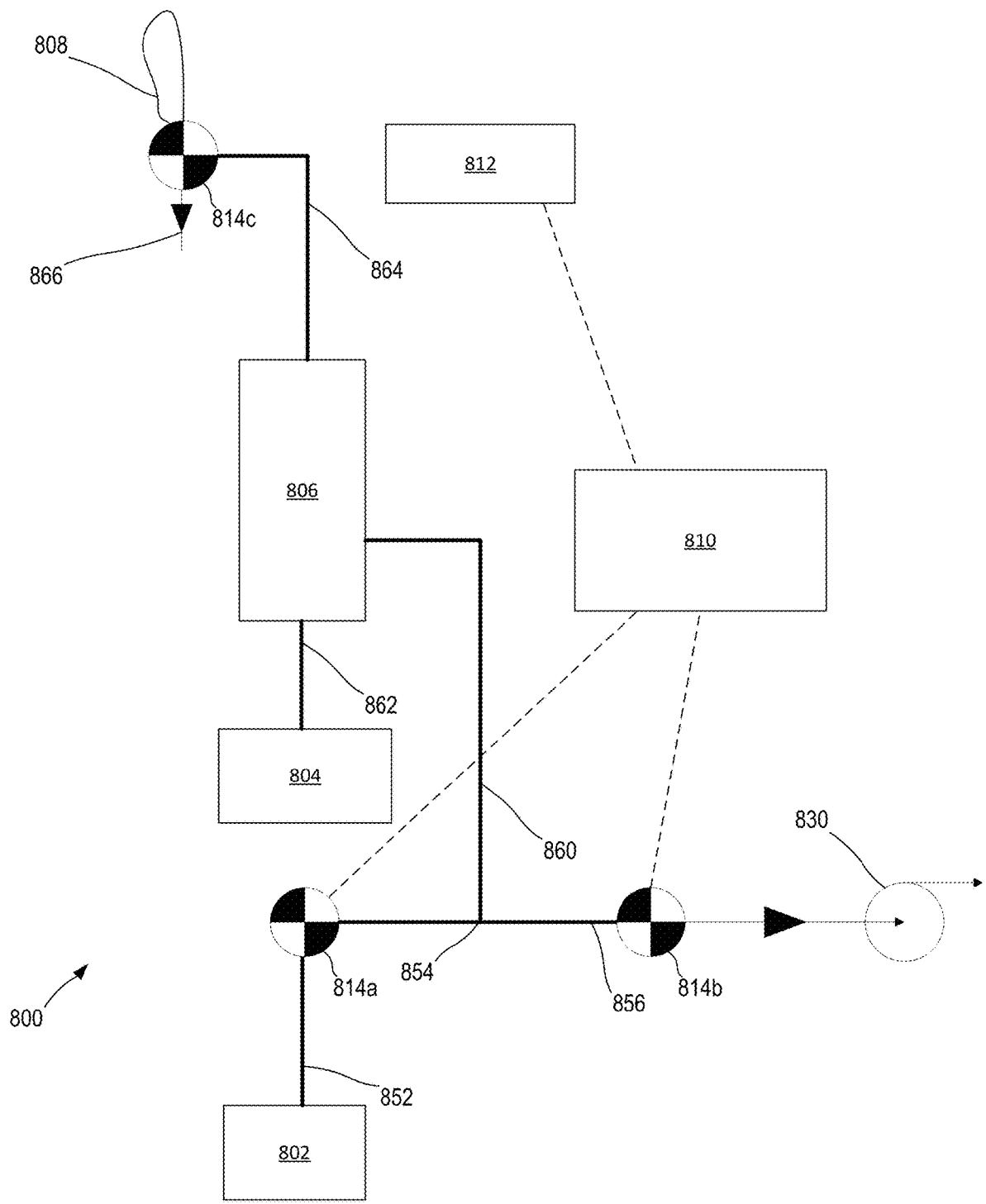
FIG. 9B is a schematic diagram of a system for selectable gas infusion including a pressure relief line, according to embodiments of the present technology.

In some embodiments, the residual pressurized gas in the fluid line 860 may be actively purged prior to flowing the beverage of the non-infused beverage through the liquid/gas infusion unit, for example as shown in FIG. 9B. In embodiments using active purging, the residual gas may be drawn out of the lines using a vacuum pump 830. For example, to draw residual gas out of the infusion lines with a vacuum pump, valve 814a is shut to prevent the flow of additional gas from the gas storage unit 802 into the fluid line 860, and the vacuum pump causes a vacuum in order to actively draw residual pressurized gas remaining in the fluid line 860 through the pressure relief line 856. While a vacuum pump is shown, in some embodiments, a compressor, a positive displacement pump, a scroll pump, a momentum transfer pump, or any other suitable means of actively removing residual gas can be used.

The user interface 812 may be a screen, a button, a dial, a switch, or any other means of receiving an input related to the infusion level of a beverage. The user interface 812 is communicatively coupled to send an input to the controller 810. The user interface 812 may receive inputs about the level of infusion a dispensed beverage is to have. For example, in the embodiments, the user interface may be a switch causing an infusion valve to open or close thus allowing for the selective infusion of a beverage with nitrogen gas to be turned on or off. An operator selects a drink through the user interface 812, which passes a signal to the controller 810 which sets the infusion state of the beverage dispensing apparatus 800 to selectively choose to infuse a beverage. In embodiments, the user interface 812 may be a dial that tunes the gas infusion percentage relative to a user's selected gas infusion percentage.

In operation, the controller 810 receives an input from the user interface 812 to determine the selective infusion of a dispensed beverage. The controller 810 is communicatively coupled with gas control valve 814a and 814b to actuate the gas control valve 814a and gas control valve 814b to set the beverage dispensing apparatus into an infusion state or a non-infusion state. In embodiments, in the absence of an input from the user interface 812, the beverage dispensing apparatus may have a default state, wherein the controller 810 maintains, and/or reverts, the beverage dispensing apparatus 800 in a default state, either infusion or non-infusion, in the absence of user input. For example, if the default state is an infusion state, the controller 810 controls the gas storage unit 802 and the beverage storage unit 804 to begin flow of each respective fluid. The flow of coffee from beverage storage unit 804 simultaneously with the flow of nitrogen gas from gas storage unit 802 into the liquid/gas infusion unit 806 produces a nitrogen-infused coffee, that then flows into the faucet assembly 808. Actuation of the faucet assembly 808 opens dispensing valve 814c and dispenses the nitrogen-infused coffee into a cup.

If the controller 810 receives a signal from the user interface 812 for non-infused coffee, the controller 810 switches the beverage dispensing apparatus 800 into a non-infusion state, closing valve 814a and opening valve 814b, such that gas from the gas storage unit 802 is prevented from flowing into the liquid/gas infusion unit 806. Without gas flowing into the liquid/gas infusion unit 806 the beverage flowing through the liquid/gas infusion unit 806 will exit the liquid/gas infusion unit 806 un-infused and flow into the faucet assembly 808, which will dispense the un-infused coffee into a cup.

Figure 10:
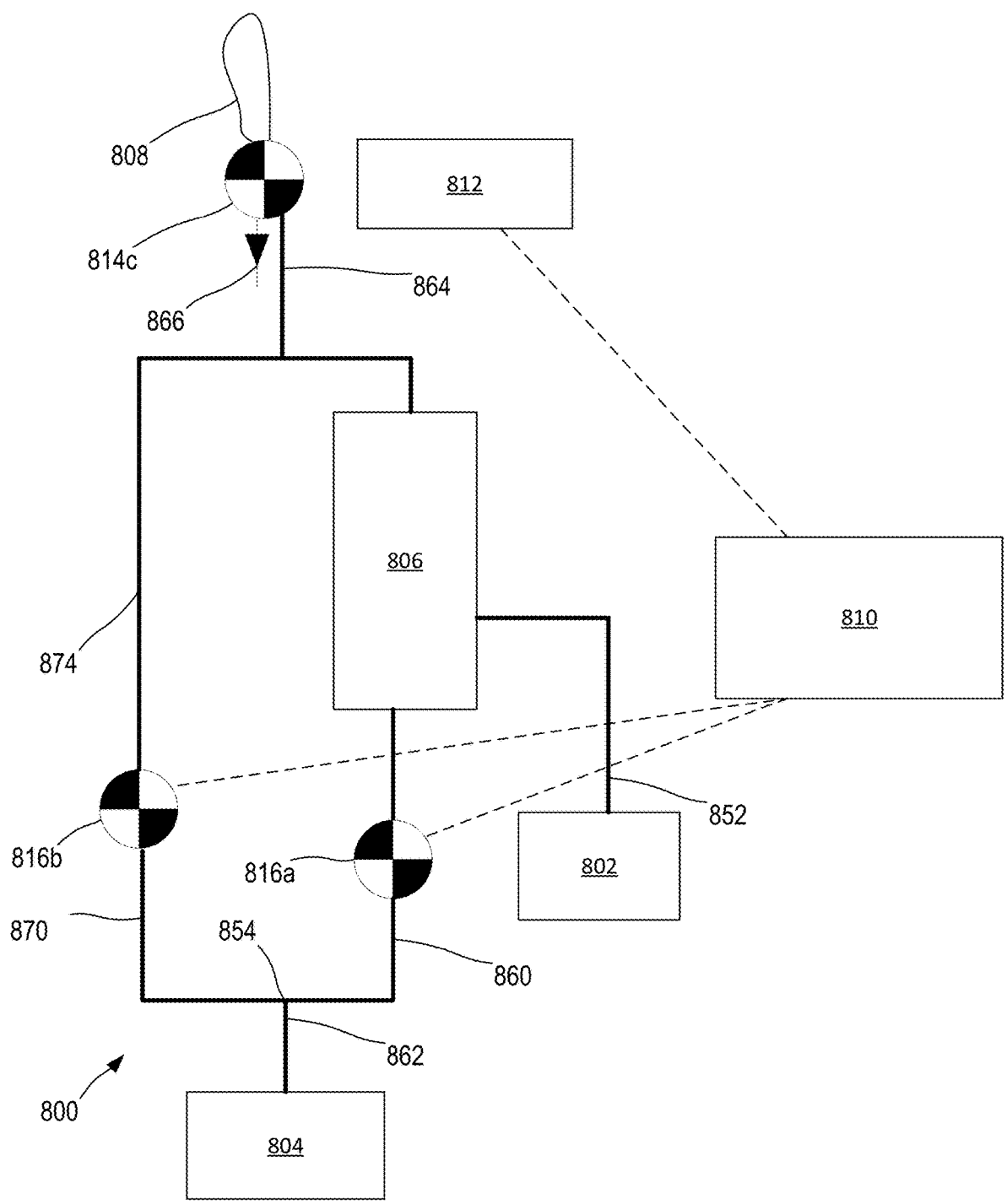
FIG. 10 is a schematic diagram of a system for selectable gas infusion including a bypass line according to embodiments of the present technology.

As noted, FIG. 9A includes an embodiment which directs both non-infused and infused beverages through the liquid/gas infusion unit 806, however in embodiments non-infused beverages may bypass the liquid/gas infusion unit 806. FIG. 10 shows an embodiment of a beverage dispensing apparatus 800 with bypass lines 870 and 874 for selective infusion, wherein the beverage flow is controlled by beverage control valves 816a and 816b.

As shown in FIG. 10, the gas storage unit 802 is fluidly connected to the liquid/gas infusion unit 806 through fluid line 852. The beverage storage unit 804 is fluidly connected to the liquid/gas infusion unit 806 through fluid line 862 and 860. The beverage storage unit 804 is fluidly connected to the faucet assembly 808 through fluid lines 870 and 874. The liquid/gas infusion unit 806 is fluidly connected to the faucet assembly 808 through fluid line 864. Valve 816a regulates fluid flow through fluid line 860. Valve 816b regulates fluid flow through fluid line 870. The fluid flowing out from the liquid/gas infusion unit 806 is regulated by the valve 814c.

The controller 810 is communicatively coupled the user interface 812 and to the valves 816a, 816b, and 814c. The controller 810 may be located in a separate compartment, physically located behind the user interface 812, or otherwise located within the beverage dispensing apparatus 800.

Beverage from beverage supply 804 flows into beverage line 862. In the embodiment of FIG. 10, fluid line 862 flows into the node 854b, which may be a wye connector. Fluid line 862 flows into fluid line 860 and fluid line 870. Fluid line 860 flows into the liquid/gas infusion unit 806, regulated by valve 816a. Fluid line 870 bypasses the liquid/gas infusion unit and flows into fluid line 874, regulated by valve 816b. Dispensed beverage flows out of the faucet assembly 808 in dispensing line 866.

Beverage from beverage supply 804 can flow through beverage line 862. The beverage flows through node 854, which leads into the bypass line 870 and infusion line 860. The node 854 may be a wye connector. The infusion line 860 directs beverage flow into the liquid/gas infusion unit to infuse with flowing gas from the gas storage unit 802, which then feeds into the supply line 864. The bypass line 870 directs the beverage directly to the supply line 864, bypassing the liquid/gas infusion unit 806. The bypass line 870 and infusion line 860 may be joined into the supply line by any connector, such as a wye connector. Any beverage therefrom pours out into the faucet 808 gets dispensed alone dispensing line 866.

In embodiments, for example as shown in FIG. 10, the liquid/gas infusion unit 806 may be in constant communication with the gas storage unit 802. In an infusion state the infusion valves are actuated to define a flow path of the beverage so that the beverage is delivered to the beverage inlet of the liquid/gas infusion unit 806 and the flowing gas infuses with the flowing beverage in the liquid/gas infusion unit 806. In the non-infusion state, the infusion valves are actuated to define a flow path of the beverage so that the beverage is not delivered to the liquid/gas infusion unit 806, and instead bypasses the liquid/gas infusion unit 806 through the fluid line 870.

The controller 810 of FIG. 10 sets the beverage dispensing apparatus 800 into an infusion state by actuating the valve 816a into an open position and the valve 816b into a closed position such that beverage is directed into the liquid/gas infusion unit 806. The controller 810 sets the beverage dispensing apparatus 800 into a non-infusion state by actuating the valve 816a into a closed position and the valve 816b into an open position, such that beverage bypasses the liquid/gas infusion unit 806.

In operation, the controller 810 receives an input from the user interface 812 to determine the selective infusion of a dispensed beverage. The controller 810 is communicatively coupled with valves 816a and 816b to actuate the valve 816a and valve 816b to set the beverage dispensing apparatus into an infusion state or a non-infusion state. In the absence of an input from the user interface 812, the beverage dispensing apparatus may have a default state, wherein the controller 810 maintains the state of the beverage dispensing apparatus 800 to output a particular beverage, until a user input indicating a different beverage selection is received. For example, if the default state is an infusion state, the controller 810 may control the gas storage unit 802 and the beverage storage unit 804 to begin flow of each respective fluid. The flow of coffee from beverage storage unit 804 simultaneously with the flow of nitrogen gas from gas storage unit 802 into the liquid/gas infusion unit 806 produces a nitrogen-infused coffee, that then flows into the faucet assembly 808. Actuation of the faucet assembly 808 opens dispensing valve 814c and dispenses the nitrogen-infused coffee into a cup.

In response to receiving an input from the user interface 812 to dispense non-infused coffee, the controller 810 switches the beverage dispensing apparatus 800 into a non-infusion state, closing valve 816a and opening valve 816b, such that beverage from the beverage storage unit 804 is prevented from flowing into the liquid/gas infusion unit 806. The beverage bypasses the liquid/gas infusion unit 806 and flows straight into the supply line 864 and directly into the faucet assembly 808, which will dispense the un-infused coffee into a cup.

In embodiments, a secondary valve may be placed downstream of the liquid/gas infusion unit 806 and before dispensing valve 814c to offset residual gas buildup within the liquid flow path.

Figure 11:
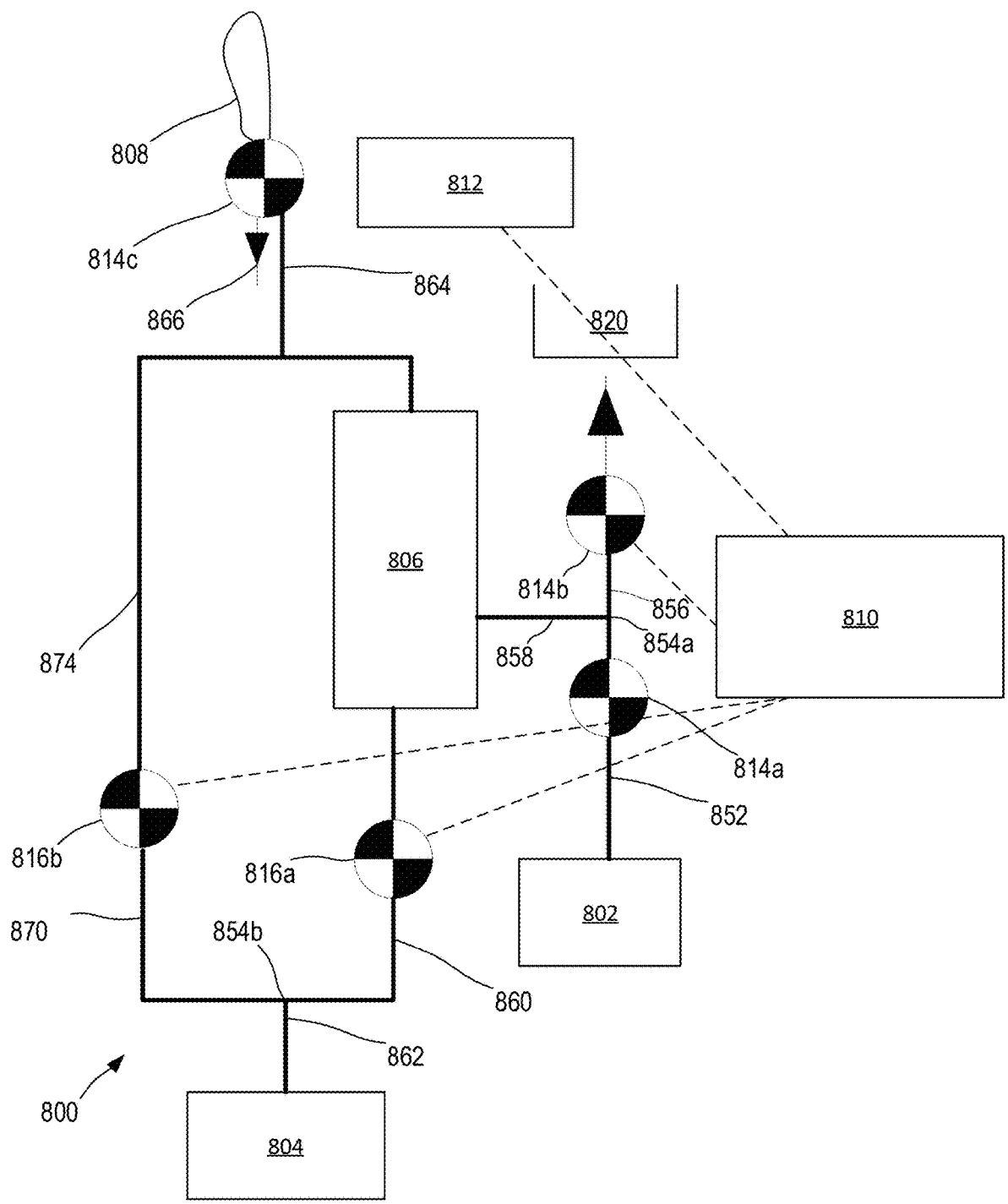
FIG. 11 is a schematic diagram of a system for selectable gas infusion including a pressure relief line and a bypass line, according to embodiments of the present technology.

FIG. 11 shows an embodiment with a bypass line and a pressure relief line for selective infusion, directing the gas through an arrangement of gas control valves 814a, 814b, and directing the beverage through an arrangement of beverage control valves 816a, 816b.

The gas storage unit 802 is fluidly connected to the liquid/gas infusion unit 806 through fluid line 852, and 858. The beverage storage unit 804 is fluidly connected to the liquid/gas infusion unit 806 through fluid line 862 and 860. The beverage storage unit 804 is fluidly connected to the faucet assembly 808 through fluid lines 870 and 874. The liquid/gas infusion unit 806 is fluidly connected to the faucet assembly 808 through fluid line 864. Valve 816a regulates fluid flow through fluid line 860. Valve 816b regulates fluid flow through fluid line 870. The fluid flowing out from the liquid/gas infusion unit 806 is regulated by the valve 814c.

The controller 810 is communicatively coupled the user interface 812 and to the valves 814a, 814b, 816a, 816b, and 814c. The controller 810 may be located in a separate compartment, physically located behind the user interface 812, or otherwise located within the beverage dispensing apparatus 800.

The gas storage unit 802 is fluidly connected to the node 854a by fluid line 852. The flow of gas through fluid line 852 is regulated by gas control valve 814a. After passing through the valve 814a, gas flowing through the gas line 852 encounters a node 854a, which splits the gas line 852 into a pressure relief line 856 and an infusion line 858. The pressure relief line 856 can reduce the internal pressure throughout the dispensing apparatus when an unwanted buildup of gas occurs, for example, when a non-infused beverage is to be dispensed immediately after an infused beverage is dispensed using either passive or active purging. While the pressure relief line 856 is shown flowing into the atmosphere 820, in some embodiments, the pressure relief line 856 can flow into a vacuum pump, such as the vacuum pump 830. The infusion line 856 allows gas to flow into the liquid/gas infusion unit 806.

Beverage from beverage supply 804 can flow through beverage line 862. The beverage flows through node 854b, which leads into the bypass line 870 and infusion line 860. The node 854b may be a wye connector. The infusion line 860 directs beverage flow into the liquid/gas infusion unit 806 through beverage control valve 816a to infuse with flowing gas from the gas storage unit 802, which then feeds into the supply line 864. The bypass line 870 directs the beverage directly to the supply line 864, bypassing the liquid/gas infusion unit 806. The bypass line 870 and infusion line 860 may be joined into the supply line by any connector, such as a wye connector. Any beverage therefrom pours out into the faucet 808 gets dispensed alone dispensing line 866.

In FIG. 11, the controller 810 sets the beverage dispensing apparatus 800 into an infusion state by actuating open valve 814a and valve 816a and closing valve 814b and valve 816b, allowing gas and beverage flow into the gas inlet and beverage inlet of the liquid/gas infusion unit 806. The controller 810 can set the beverage dispensing apparatus 800 into a non-infusion state either by actuating valve 814a closed, actuating valve 816b open and closing valve 816a, or both. The controller 810 may set the beverage dispensing apparatus 800 into a default state in the absence of a signal from the user interface 812 to either of the infusion state or the non-infusion states.

The controller 810 may operate or actuate any of the gas control valves 814a, 814b or beverage control valves 816a, 816b as suitable to dispense a selected beverage.

The beverage control valve 816a controls the flow of beverage through the liquid/gas infusion unit 806. The beverage control valve may be upstream or downstream of the liquid/gas infusion unit 806 and in either position may be used to prevent a flow of beverage through the liquid/gas infusion unit 806. In embodiments for example as shown in FIG. 11, beverage control valve 816a is upstream of the liquid/gas infusion unit 806 to prevent beverage from entering the liquid/gas infusion unit 806. In embodiments, 816A may be downstream of liquid/gas infusion unit 806, for example as shown in FIG. 11, and therefore prevents beverage from exiting the liquid/gas infusion unit 806.

Figure 12:
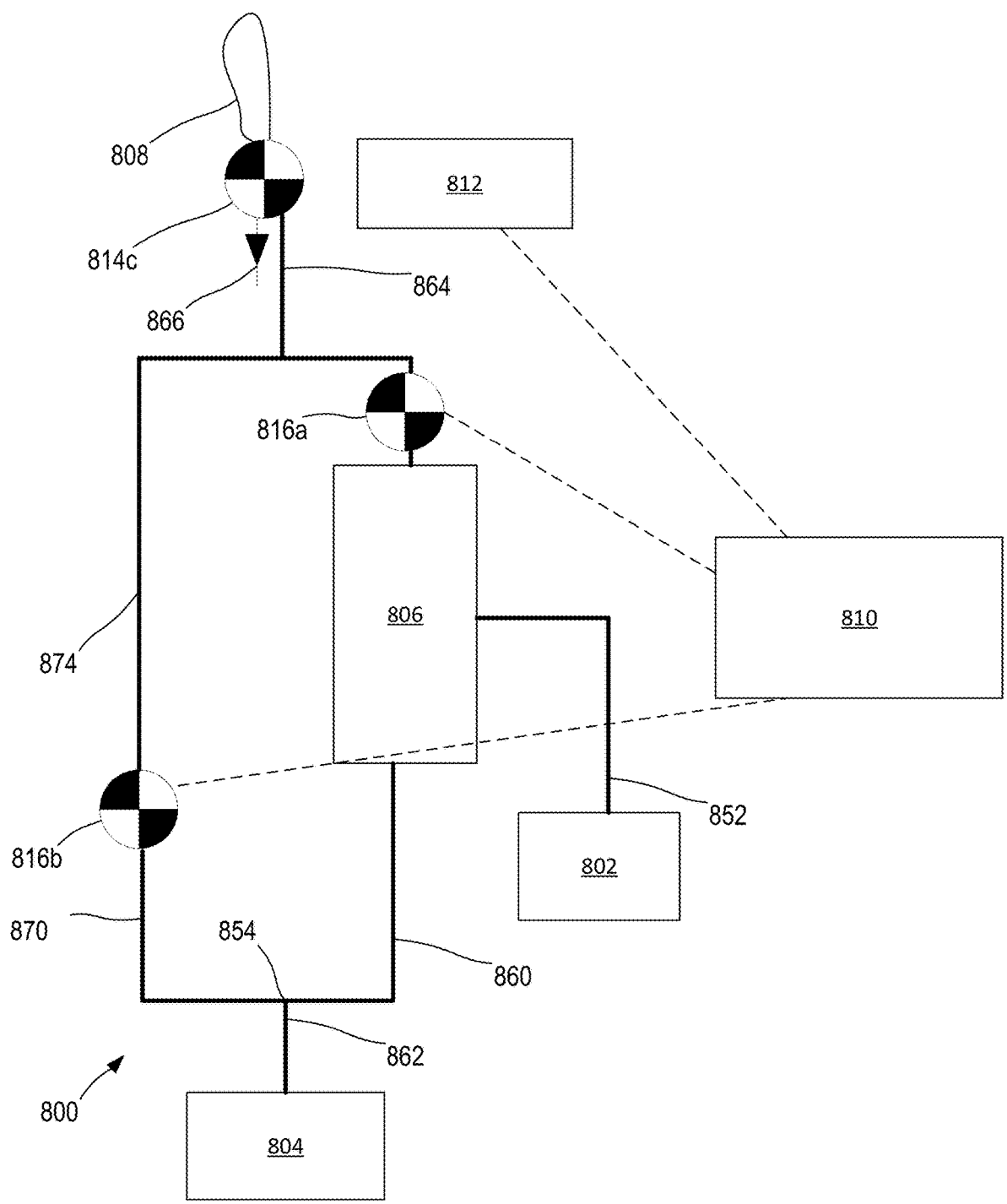
FIG. 12 is a schematic diagram of a system for selectable gas infusion including a pressure relief line, according to embodiments of the present technology.

FIG. 12 shows an embodiment of the beverage dispensing apparatus with an alternative placement of the beverage control valve 816a downstream of the liquid/gas infusion unit 806.

The beverage control valve 816a being located downstream of the liquid/gas infusion unit 806 may further prevent gas from the gas storage unit 802 being delivered to the liquid/gas infusion unit 806 during non-infused beverage dispensing from reaching the faucet assembly 808. Beverage control valve 816a may act in embodiments, for example as shown in FIG. 12, as the infusion valve.

While the above embodiments show specific locations for the various control valves, the valves may be located anywhere along the fluid flow path, so long as the relative position of one valve to the other valves is maintained. For example, in FIG. 8, while gas control valve 814a is shown closer to the gas storage unit 802 than the liquid/gas infusion unit 806, the gas control valve 814a may also be located closer to the liquid/gas infusion unit 806 than the gas storage unit 802 and maintain the flow path of the gas through the beverage dispensing apparatus 800.

Further, while a specific number of valves have been shown in the figures, any number of additional check valves can be added to control the flow of the beverage or gas. For example, check valves can be used to regulate fluid flow, prevent backflow, bypass particular junctures or otherwise. The valve placement and number of valves shown is not intended to be limiting on the disclosure.

The embodiments shown in FIGS. 8-12 show a single faucet for dispensing a selected beverage individually, but embodiments shown can be in the same housing to form a multi-tap dispensing system. In some embodiments, multiple systems can share common components, such as a common gas supply, common beverage supply or otherwise.

Figure 13:
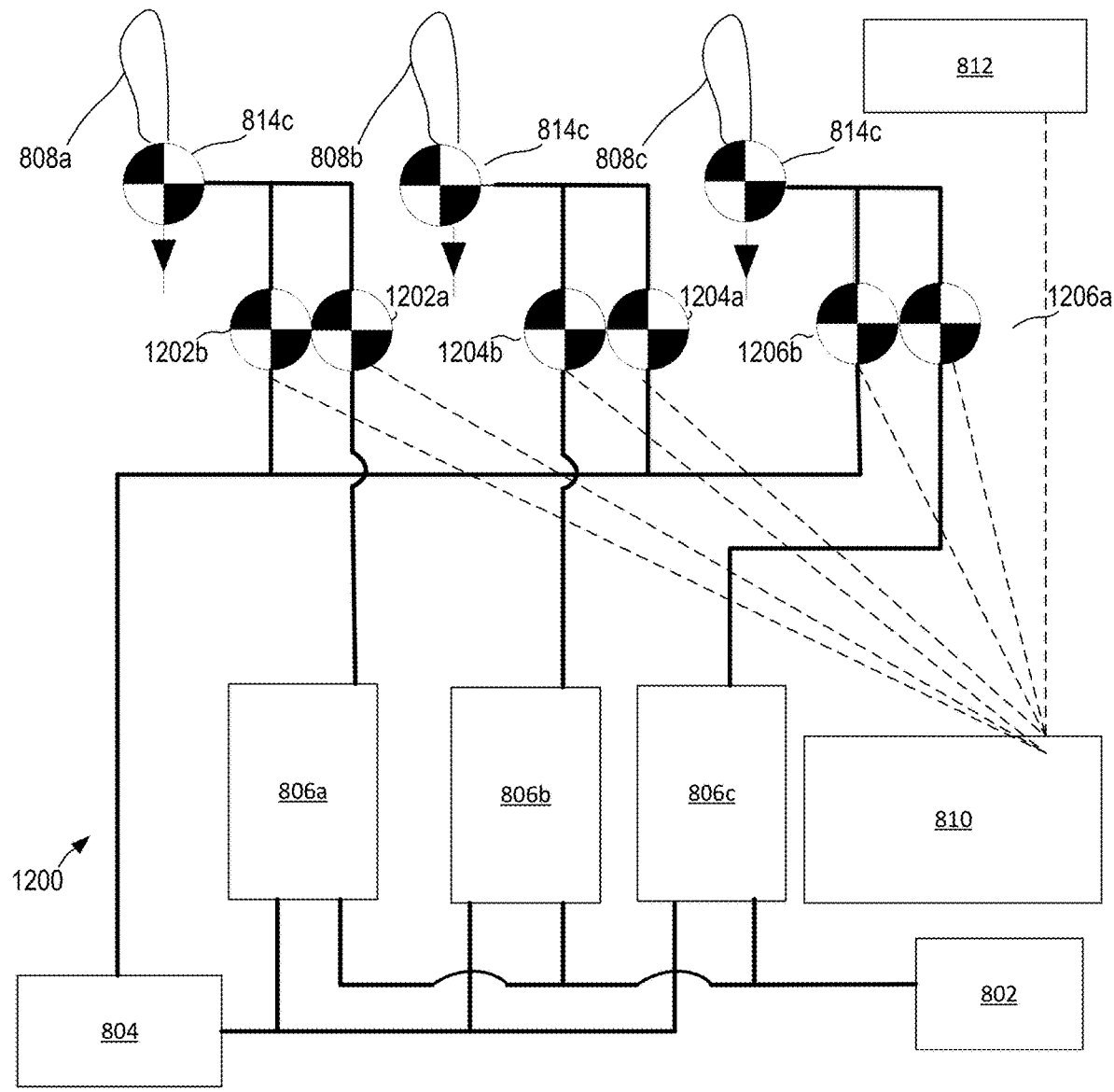
FIG. 13 is a schematic diagram of a system for selectable gas infusion showing a multi-tap dispensing system according to embodiments of the present technology.

In embodiments, a system may include multiple faucets, wherein each faucet may share one or more system component with another faucet. In embodiments, for example as shown in FIG. 13, a beverage dispensing apparatus 1200 comprises multiple tabs. Beverage dispensing apparatus 1200 may have additional faucet assemblies 808a, 808b, and 808c. Each tap may have a liquid/gas infusion unit, 806a, 806b, and 806c respectively. Each respective faucet 808a, 808b, and 808c has beverage control valves 1202a, 1204a, 1206a and 1202b, 1204b, 1206b to control for infused and non-infused beverages respectively.

In embodiments with a multi-tap faucet, the system, such as system 1200, may have a user interface designed for multiple users. The user interface can be user interface 812. The user interface can be a single screen designed to receive multiple orders in succession, can be multiple screens that send an input to a single controller, such as controller 810, can be a panel designed to receive multiple inputs corresponding to each respective tap, or any suitable interface for receiving and sending multiple inputs that relate to each specific tap. In embodiments, the user interface may send a signal specifying an infused or non-infused beverage and the controller may decide which tap is to dispense which beverage.

Beverage dispensing apparatus 1200 may have the faucets 808a, 808b, and 808c as part of the same system. The different faucets 808a, 808b, and 808c can be simultaneously operated independently from the other faucets in order to dispense a beverage having the same or different selective infusion as beverages dispensed by the other faucets. For example, in operation, three users may approach each tap. User 1 may select a non-infused beverage, User 2 and User 3 may select an infused beverage from beverage dispensing apparatus 1200. After interacting with the user interface 812 to make their respective selections, the controller 810 may open beverage control valves 1202b, 1204a, and 1206a while closing beverage control valves 1202a, 1204b, and 1206b. Thus, faucet assembly 808a will dispense a non-infused beverage, faucet assembly 808b will dispense an infused beverage, and faucet assembly 808c will dispense an infused beverage. The faucet assembly 808a 808b, and 808c may dispense independently of the dispensing of any other faucet at variable times.

The controller 810 can set a different infusion state for each individual faucet assembly, such that the beverage flowing out of faucet 808a may be different than that of faucet 808b and different from that of 808c. Moreover, each respective faucet assembly may have different default states as well, such that, without a signal from a user interface, the controller 810 sets the state of the system to dispense different beverages from each respective faucet. In embodiments, the beverage dispensing apparatus 1200 may have the same default state so the same beverage is dispensed from each respective faucet assembly 808a, 808b, and 808c.

While FIG. 13 shows three taps, the beverage dispensing apparatus 1200 may have 2, 4, 5, 6, or more taps as suitable for use.

Figure 14:
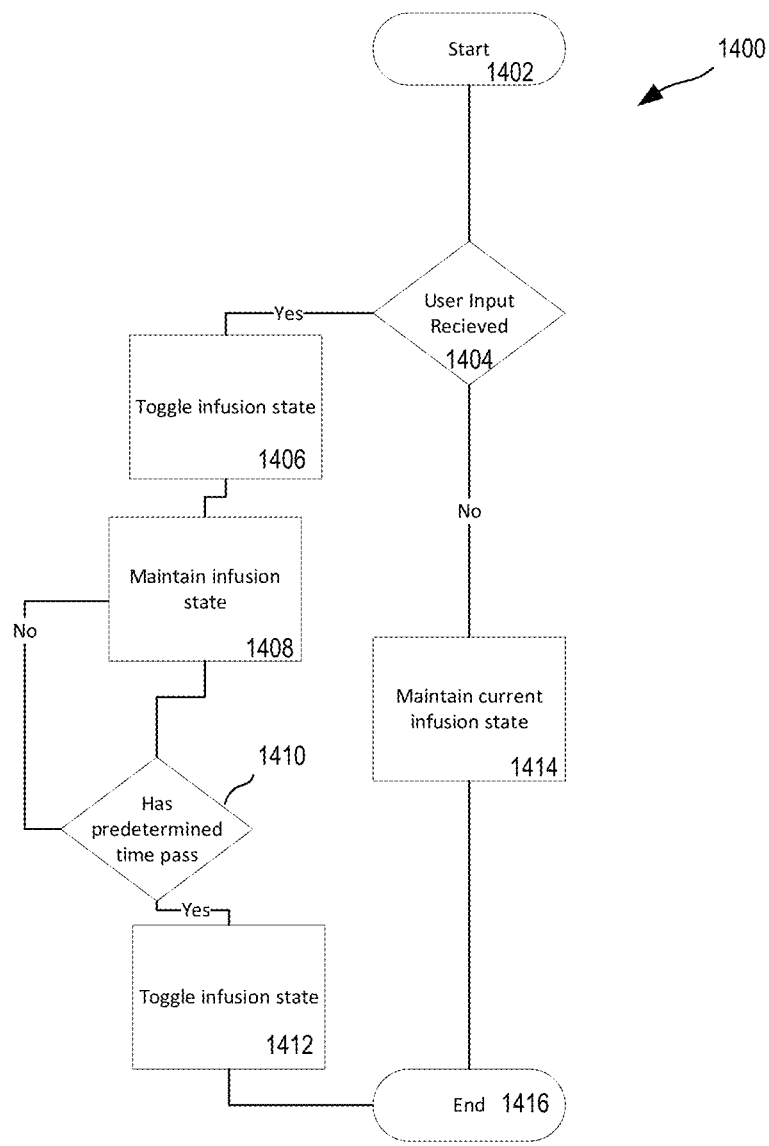
FIG. 14 is a logic diagram for a controller in dispensing a drink, according to embodiments of the present technology.

FIG. 14 is a logic diagram 1400 showing the steps a controller, such as controller 810, may take in response to a selected beverage according to embodiments.

In operation 1402, the controller begins operation. The controller may be a controller of, for example, a beverage dispensing apparatus, such as beverage dispensing apparatus 800.

In operation 1404, the controller receives a user input. The user input may be to infuse a beverage, to not dispense a beverage, to toggle an infusion state within the system. In the logic diagram, two decision points are shown branching from operation 1404, denoted "Yes" and "No." The "Yes" may indicate for the controller to switch the infusion state of the beverage dispensing apparatus. The "No" may indicate for the controller to maintain the current infusion state of the beverage dispensing apparatus.

In response to receiving a signal to switch the infusion state, the controller toggles the infusion state of the beverage dispensing apparatus. In embodiments, switching the infusion state may be by actuating valves within the beverage dispensing apparatus, such as valves 814a, 814b, 816a, or 816b, as described above in FIGS. 9-13. In embodiments, switching the infusion state may be actuating an infusion valve into an open state to cause infusion of a beverage with a gas.

In operation 1408, the controller maintains the toggled infusion state. For a system switched to an infusion state, the controller maintains the system in an infusion state. For a system switched to a non-infusion state, the controller maintains the system in a non-infusion state.

In embodiments, after the controller changes the infusion state in response to a user input the controller may revert the system back to the default state after a predetermined time, stored by the controller, elapses. For example, with a non-infusion default state, after receiving a user input causing a change to the infusion state, the infusion state is maintained for a period of time after which the controller reverts the device to the default non-infusion state. The predetermined period of time may correspond to an amount of time to allow the user to dispense the largest sized beverage available. Reverting to the default state after a predetermined time is beneficial in saving time by allowing user to assume that the device is in the default state even if it was recently used to dispense a non-default state beverage. The predetermined amount of time may be 5 seconds, 10 seconds, 15 seconds, 20 seconds, or 30 seconds. In embodiments, the predetermined amount of time may be set by the user.

In operation 1410, the controller measures if the predetermined amount of time has elapsed. In response to determining that the predetermined amount of time has not elapsed, the controller maintains the current infusion state. In response to determining that the predetermined amount of time has elapsed the controller proceeds to operation 1412.

In operation 1412, the controller toggles the infusion state. The beverage dispensing apparatus returns back to the default infusion state of the system. Thus, if the beverage dispensing apparatus is toggled off of the default state, then after the predetermined amount of time, the beverage dispensing apparatus toggles back to the default infusion state.

In response to receiving user input in operation 1404 that does not correspond to the beverage dispensing apparatus changing infusion states, such as, for example, a signal to dispense an infused beverage when the beverage dispensing apparatus is in an infused beverage state, the controller maintains the current infusion state or the default infusion state of the system in operation 1414. In embodiments, the default infusion state of the system may be an infusion state to dispense an infused beverage. In embodiments, the default infusion state of the system may be a non-infusion state to dispense a non-infused beverage.

In operation 1416, the controller ends operation. In embodiments, ending the operation may be shutting the dispensing valve, such as valve 814c, shutting off the beverage supply, shutting off the gas supply, or opening a pressure relief valve, such as valve 814b. After operation 1416, the controller may prepare the beverage dispensing apparatus to dispense the next drink, such as, for example, opening a pressure relief line, such as pressure relief line 856 shown in the embodiment of FIG. 9A or FIG. 9B.

In embodiments, the user interface may be a manual switch toggle. For example, the manual switch may be a button, a switch, a lever, or otherwise. In such embodiments, the actuation of the manual switch may send a signal to the controller to change the state of the beverage dispensing apparatus.

Figure 15:
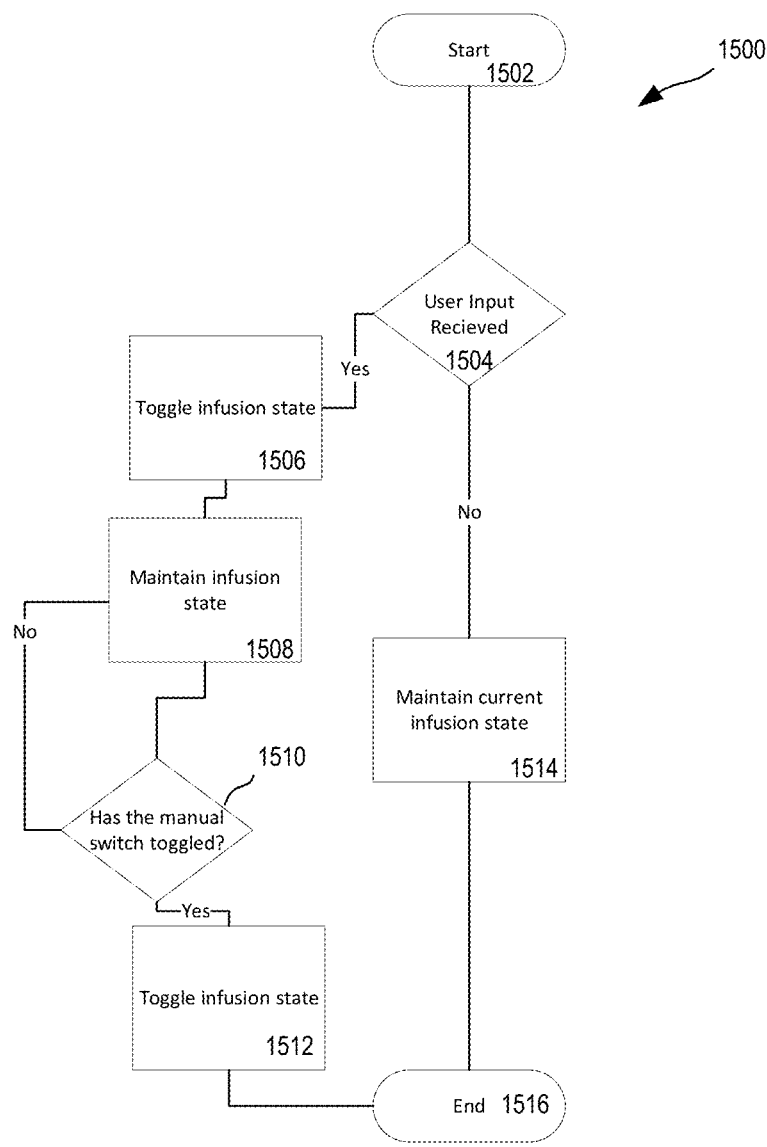
FIG. 15 is a logic diagram for a controller in dispensing a drink, according to embodiments of the present technology.

FIG. 15 shows a logic diagram 1500 showing the steps a controller, such as controller 810, may take in response to a selected beverage, according to embodiments.

In operation 1502, the controller begins operation. The controller may be a controller of, for example, a beverage dispensing apparatus, such as beverage dispensing apparatus 800.

In operation 1504, the controller receives a user input. The user input may be to infuse a beverage, or to not infuse a beverage. The controller may respond to a manual switch such as a button, a switch, a lever or otherwise. In the logic diagram, two decision points are shown branching from operation 1504, denoted "Yes" and "No." The "Yes" may indicate for the controller to switch the infusion state of the beverage dispensing apparatus. The "No" may indicate for the controller to maintain the current infusion state of the beverage dispensing apparatus.

In embodiments, switching the infusion state may be by actuating valves within the beverage dispensing apparatus, such as valves 814a, 814b, 816a, or 816b, as described above in FIGS. 9-13. In embodiments, switching the infusion state may be actuating an infusion valve into an open state to cause infusion of a beverage with a gas.

In operation 1508, the controller maintains the toggled infusion state. For a system switched to an infusion state, the controller maintains the system in an infusion state. For a system switched to a non-infusion state, the controller maintains the system in a non-infusion state.

In operation 1510, the controller may check the state of the manual switch. For example, if the manual switch has not been toggled, the beverage dispensing apparatus may maintain the infusion state until the switch is toggled. Once the switch has been toggled. the controller may proceed to operation 1512.

In operation 1512, once the switch has been toggled, the controller may actuate valves to switch the infusion state of the beverage dispensing apparatus to the respective other infusion state. For example, if the beverage dispensing apparatus is in an infusion state, after being toggled, the controller switches the beverage dispensing apparatus to a non-infusion state. Conversely, if the beverage dispensing apparatus is in a non-infusion state, after being toggled, the controller switches the beverage dispensing apparatus to an infusion state.

In operation 1516, the controller ends operation. In embodiments, ending the operation may be shutting the dispensing valve, such as valve 814c, shutting off the beverage supply, shutting off the gas supply, or opening a pressure relief valve, such as valve 814b. After operation 1516, the controller may prepare the beverage dispensing apparatus to dispense the next drink.

Although specific embodiments of the disclosure have been described, various modifications, alterations, alternative constructions, and equivalents are also encompassed within the scope of the disclosure. Embodiments of the present disclosure are not restricted to operation within certain specific environments, but are free to operate within a plurality of environments. Additionally, although method embodiments of the present disclosure have been described using a particular series of operations and steps, it should be apparent to those skilled in the art that the scope of the present disclosure is not limited to the described series of operations and steps.

The specification and drawings are, accordingly, to be regarded in an illustrative rather than a restrictive sense. It will, however, be evident that additions, subtractions, deletions, and other modifications and changes may be made thereunto without departing from the broader spirit and scope.

The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. As used herein, the meaning of "a," "an," and "the" includes singular and plural references unless the context clearly dictates otherwise.

Thus, this disclosure is not intended to be limited to the embodiments shown, but is to be accorded the widest scope consistent with the principles and features disclosed herein. In this regard, certain embodiments within the disclosure may not show every benefit of the invention, considered broadly.

What is claimed is:

1. A beverage dispensing apparatus for dispensing a beverage with a user selected level of infusion with a gas containing nitrogen, the apparatus comprising:
    a faucet assembly comprising:
        a dispense tower;
        a nozzle coupled to the dispense tower;
        a supply line; and
        a dispensing valve coupled to the dispense tower and fluidly coupled between the nozzle and the supply line, wherein the dispensing valve is configured to be actuated to open and close to control a flow of the beverage from the supply line to the nozzle;
    a beverage storage unit configured to store an un-infused beverage;
    a gas storage unit configured to store the gas;
    a liquid/gas infusion unit fluidly coupled to the beverage storage unit and the supply line, wherein the liquid/gas infusion unit is configured to infuse the un-infused beverage with the gas in response to the gas and the un-infused beverage flowing through the liquid/gas infusion unit;
    at least one infusion valve configured to adjust a level of infusion of the un-infused beverage with the gas;
    an infusion line provided between the gas storage unit and the liquid/gas infusion unit configured to deliver the gas to the liquid/gas infusion unit; and
    a pressure relief valve fluidly coupled to atmosphere and to the infusion line, wherein the pressure relief valve is configured to control a release of gas in the infusion line into the atmosphere.

2. The beverage dispensing apparatus of claim 1, further comprising:
    a controller;
    wherein the at least one infusion valve is connected to and configured to be actuated by the controller,
    wherein the at least one infusion valve includes at least one of:
    a gas control valve fluidly coupled between the gas storage unit and the liquid/gas infusion unit; and
    a beverage control valve fluidly coupled between the beverage storage unit and the liquid/gas infusion unit;
    wherein the faucet assembly further comprises a user interface coupled to the dispense tower, wherein the user interface is configured to receive a user selected level of infusion as user input and send the user input to the controller,
    wherein the controller is configured to:
    receive a first input signal from the user interface in response to the user input, and in response to receiving the first input signal, control the at least one infusion valve to cause the gas and the un-infused beverage to flow into the liquid/gas infusion unit so that opening the dispensing valve causes the un-infused beverage to flow through the liquid/gas infusion unit and be infused with the gas prior to flowing from the liquid/gas infusion unit through the supply line, through the dispensing valve and out the nozzle, or
    receive a second input signal from the user interface in response to the user input, and in response to receiving the second input signal, control the at least one infusion valve to prevent the gas from being delivered to liquid/gas infusion unit and so that opening the dispensing valve causes the un-infused beverage to flow through the supply line, through the dispensing valve and out the nozzle without being infused with the gas.

3. The beverage dispensing apparatus of claim 2, wherein the at least one infusion valve includes the gas control valve fluidly coupled between the gas storage unit and the liquid/gas infusion unit, and
    wherein the controller is configured to actuate the infusion valve to control a flow of the gas into the liquid/gas infusion unit in order to control a level of infusion of the un-infused beverage with the gas.

4. The beverage dispensing apparatus of claim 3, further comprising
a vacuum pump, wherein the pressure relief valve is configured to control a release of gas in the infusion line into the vacuum pump,
wherein the controller is configured to open the pressure relief valve in response to the infusion valve transitioning from being opened to closed so that the gas in the infusion line is removed from the infusion line by the vacuum pump.

5. The beverage dispensing apparatus of claim 2, wherein the at least one infusion valve includes the gas control valve fluidly coupled between the gas storage unit and the liquid/gas infusion unit, and
wherein the controller is configured to close the infusion valve so that the gas is not delivered to liquid/gas infusion unit and so that opening the dispensing valve causes the un-infused beverage to flow through the liquid/gas infusion unit and not be infused with the gas prior to flowing through the supply line, through the dispensing valve and out the nozzle.

6. The beverage dispensing apparatus of claim 2, wherein the at least one infusion valve includes the beverage control valve fluidly coupled between the beverage storage unit and supply line, and
wherein the controller is configured to cause the beverage control valve to open or close to control a flow of the un-infused beverage through the liquid/gas infusion unit in order to selectively infuse or not infuse the un-infused beverage with the gas.

7. The beverage dispensing apparatus of claim 6, wherein the beverage control valve is fluidly coupled between the beverage storage unit and the liquid/gas infusion unit.

8. The beverage dispensing apparatus of claim 6, wherein the beverage control valve is fluidly coupled between the liquid/gas infusion unit and the supply line.

9. The beverage dispensing apparatus of claim 6, further comprising:
a bypass line fluidly coupled between the beverage storage unit and the supply line,
wherein the bypass line, the liquid/gas infusion unit, and the beverage control valve are configured so that opening the dispensing valve with the beverage control valve closed causes the un-infused beverage to flow through the bypass line, through the supply line, through the dispensing valve and out the nozzle without flowing through the liquid/gas infusion unit.

10. The beverage dispensing apparatus of claim 9, wherein the beverage control valve is a first beverage control valve, the apparatus further comprising:
a wye connector comprising a first coupling fluidly coupled to the beverage storage unit; and
a second beverage control valve fluidly coupled between the bypass line and a second coupling of the wye connector, wherein the second beverage control valve is coupled to the controller;
wherein the first beverage control valve and the liquid/gas infusion unit are fluidly coupled between the supply line and a third coupling of the wye connector, and
wherein the controller is configured to cause the second beverage control valve to open and the first beverage control valve to close in order to cause the un-infused beverage to flow into the bypass line and not through the liquid/gas infusion unit so that the un-infused beverage is not infused with the gas.

11. The beverage dispensing apparatus of claim 10, wherein the controller is configured to:

receive the first input signal from the user interface, and in response to receiving the first input signal, control the first beverage control valve to open the first beverage control valve to deliver the un-infused beverage to the liquid/gas infusion unit and to control the gas control valve to open the gas control valve to deliver the gas to the liquid/gas infusion unit so that opening the dispensing valve causes the un-infused beverage to flow through the liquid/gas infusion unit and be infused with the gas prior to flowing from the liquid/gas infusion unit through the supply line, through the dispensing valve and out the nozzle.

12. The beverage dispensing apparatus of claim 11, wherein the controller is further configured to:
control at least the gas control valve a predetermined time after the first input signal is received to return the beverage dispensing apparatus to a state prior to the first input signal so that at the predetermined time the gas is not delivered to liquid/gas infusion unit and so that opening the dispensing valve at the predetermined time causes the un-infused beverage to flow through the supply line, through the dispensing valve and out the nozzle without being infused with the gas.

13. The beverage dispensing apparatus of claim 12, wherein the predetermined time is greater than 10 seconds.

14. The beverage dispensing apparatus of claim 10, wherein the controller is configured to:
receive the second input signal from the user interface, and in response to receiving the second input signal, control at least the gas control valve to close at least the gas control valve so that the gas is not delivered to liquid/gas infusion unit and so that opening the dispensing valve causes the un-infused beverage to flow through the supply line, through the dispensing valve and out the nozzle without being infused with the gas.

15. The beverage dispensing apparatus of claim 14, wherein the controller is further configured to:
control at least the gas control valve a predetermined time after the first input signal is received to return the beverage dispensing apparatus to a state prior to the second input signal so that at the predetermined time opening the dispensing valve causes the un-infused beverage to flow through the liquid/gas infusion unit and be infused with the gas prior to flowing from the liquid/gas infusion unit through the supply line, through the dispensing valve and out the nozzle.

16. The beverage dispensing apparatus of claim 15, wherein the predetermined time is greater than 10 seconds.

17. The beverage dispensing apparatus of claim 2, wherein the user interface comprises a single button associated with the nozzle.

18. The beverage dispensing apparatus of claim 1, wherein the at least one infusion valve is configured to control a gas pressure of the gas entering the liquid/gas infusion unit to between 0% and 2000% of a beverage pressure of the un-infused beverage entering the liquid/gas infusion unit.

19. The beverage dispensing apparatus of claim 18, wherein the at least one infusion valve is configured to control a gas pressure of the gas entering the liquid/gas infusion unit to between 5% and 2000% of a beverage pressure of the un-infused beverage entering the liquid/gas infusion unit.

20. The beverage dispensing apparatus of claim 18, further comprising:
a controller;

wherein the at least one infusion valve is connected to and configured to be actuated by the controller, wherein the at least one infusion valve includes a gas control valve fluidly coupled between the gas storage unit and the liquid/gas infusion unit;

wherein the faucet assembly further comprises a user interface coupled to the dispense tower, wherein the user interface is configured to receive a user selected level of infusion as a user input and send the user input to the controller, and wherein the controller is configured to open or close the at least one infusion valve, in response to receiving the user input, so that opening the dispensing valve causes the beverage to flow through the nozzle with the user selected level of infusion.

\* \* \* \* \*